July 18, 1933.    H. R. PHILLIPS ET AL    1,918,824
MATERIAL CUTTING AND WRAPPING MACHINE
Filed Nov. 19, 1929    11 Sheets-Sheet 4

INVENTORS.
Harley R. Phillips
Henry J. Clarke
by Thomas H. Ferguson
ATTORNEY.

July 18, 1933.  H. R. PHILLIPS ET AL  1,918,824
MATERIAL CUTTING AND WRAPPING MACHINE
Filed Nov. 19, 1929  11 Sheets-Sheet 5
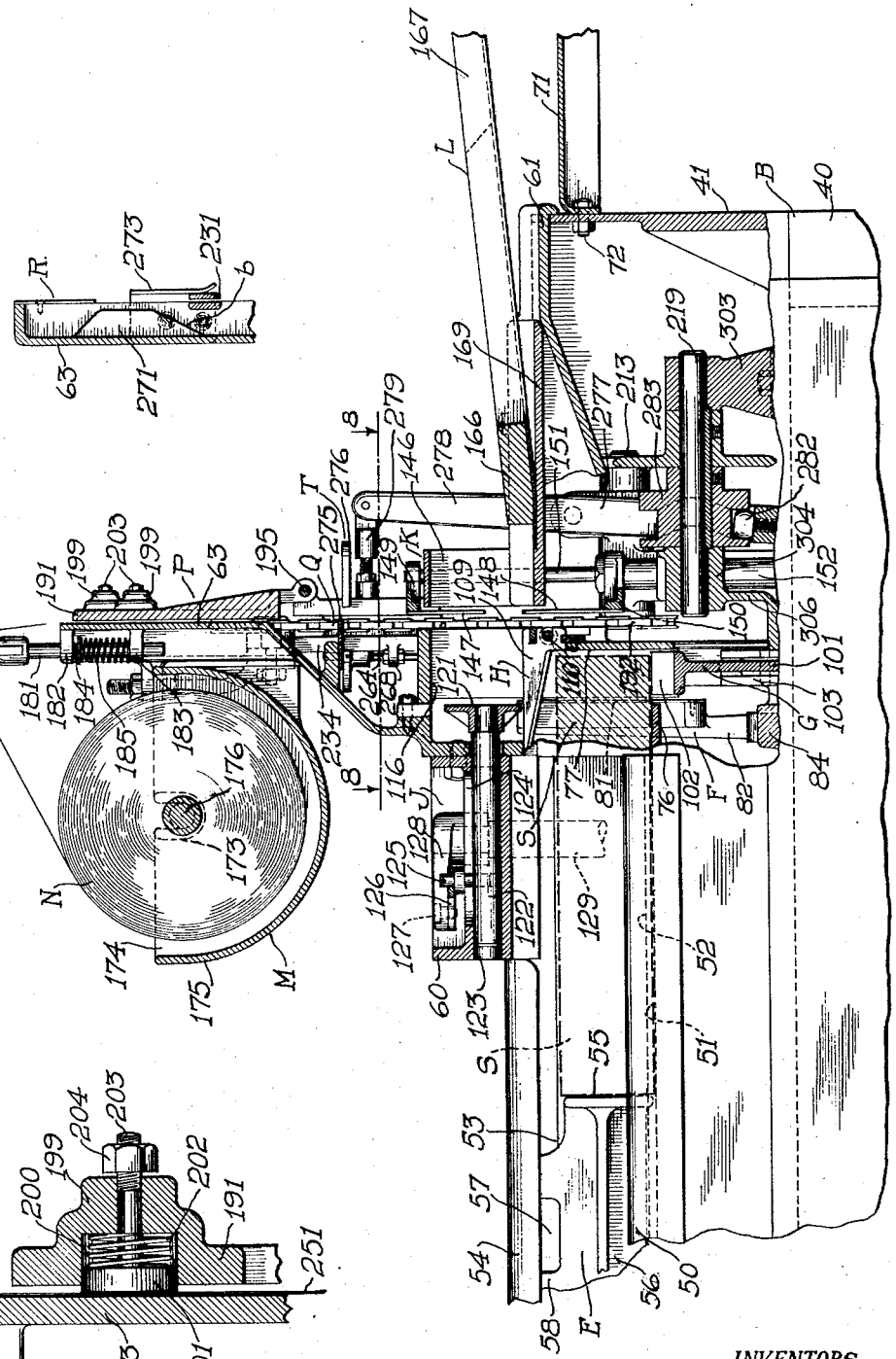
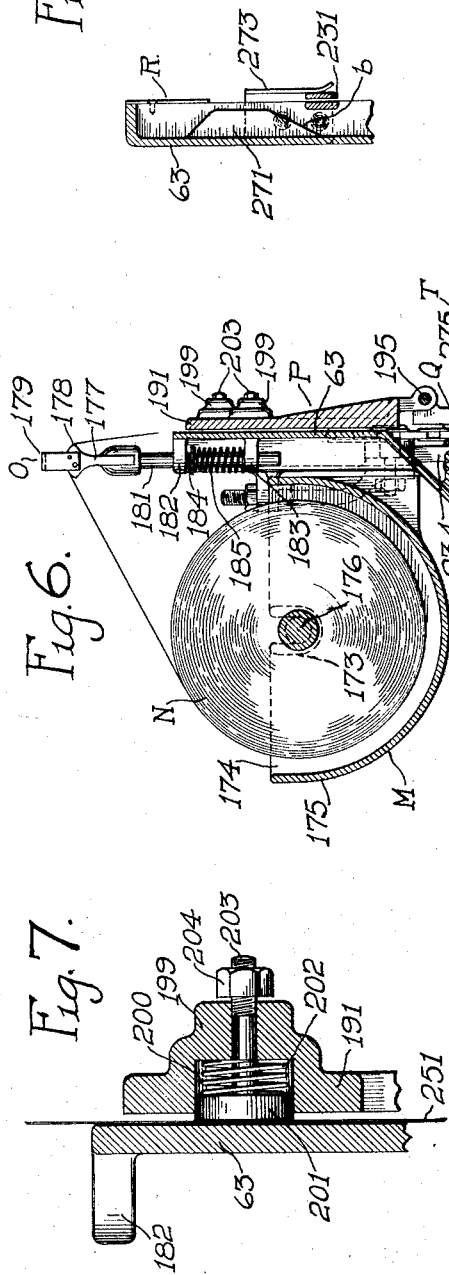
INVENTORS.
Harley R. Phillips
Henry J. Clarke
by Thomas H. Ferguson
ATTORNEY.

July 18, 1933.    H. R. PHILLIPS ET AL    1,918,824
MATERIAL CUTTING AND WRAPPING MACHINE
Filed Nov. 19, 1929    11 Sheets-Sheet 6
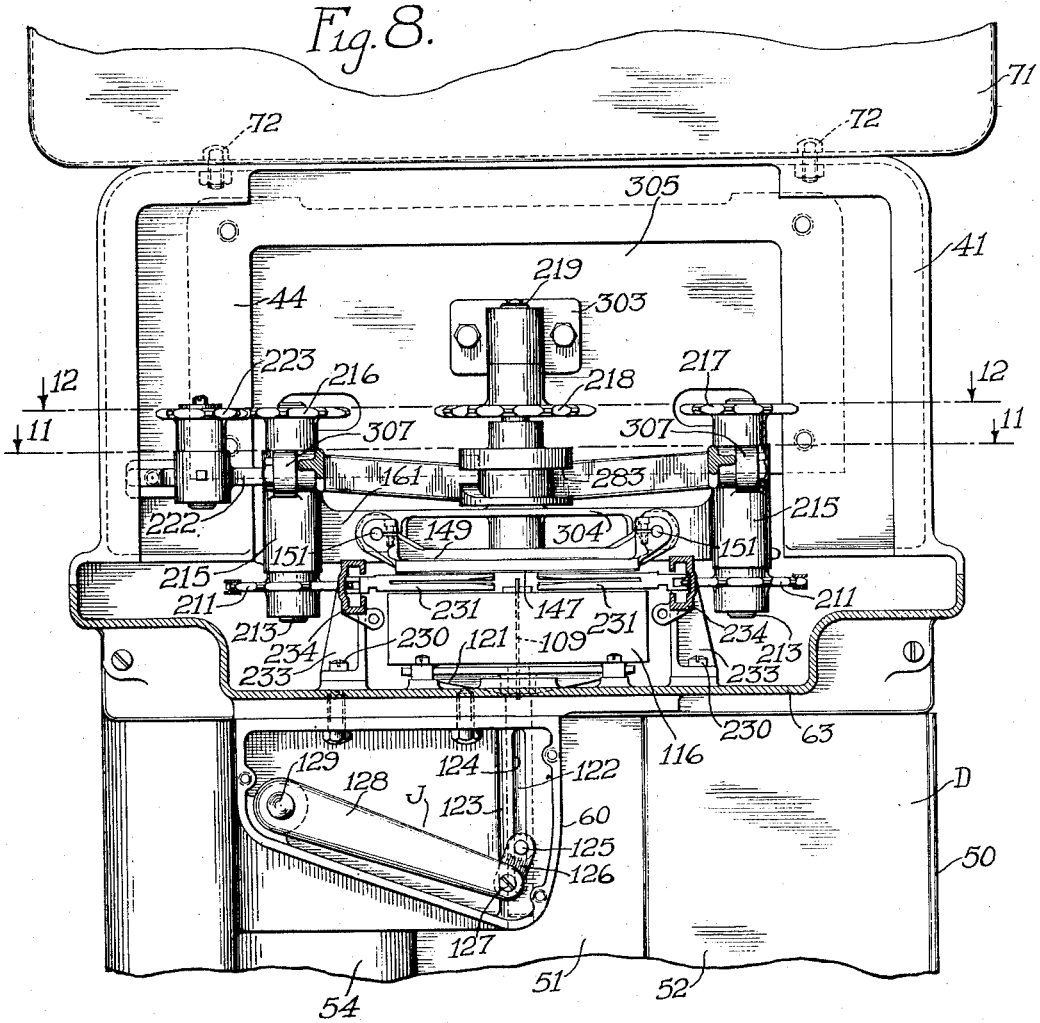
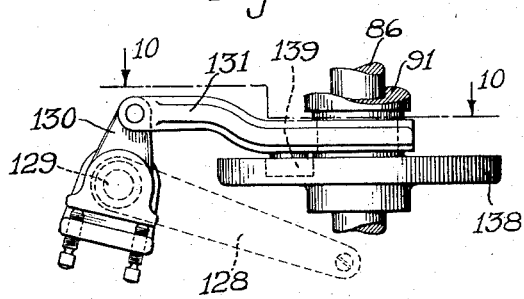
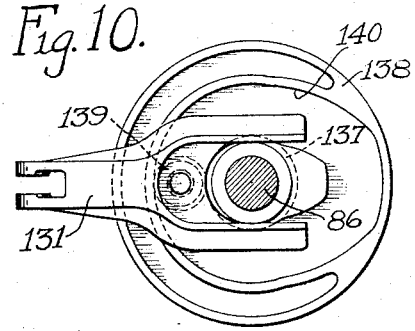
INVENTORS.
Harley R. Phillips
Henry J. Clarke
by Thomas H. Ferguson
ATTORNEY.

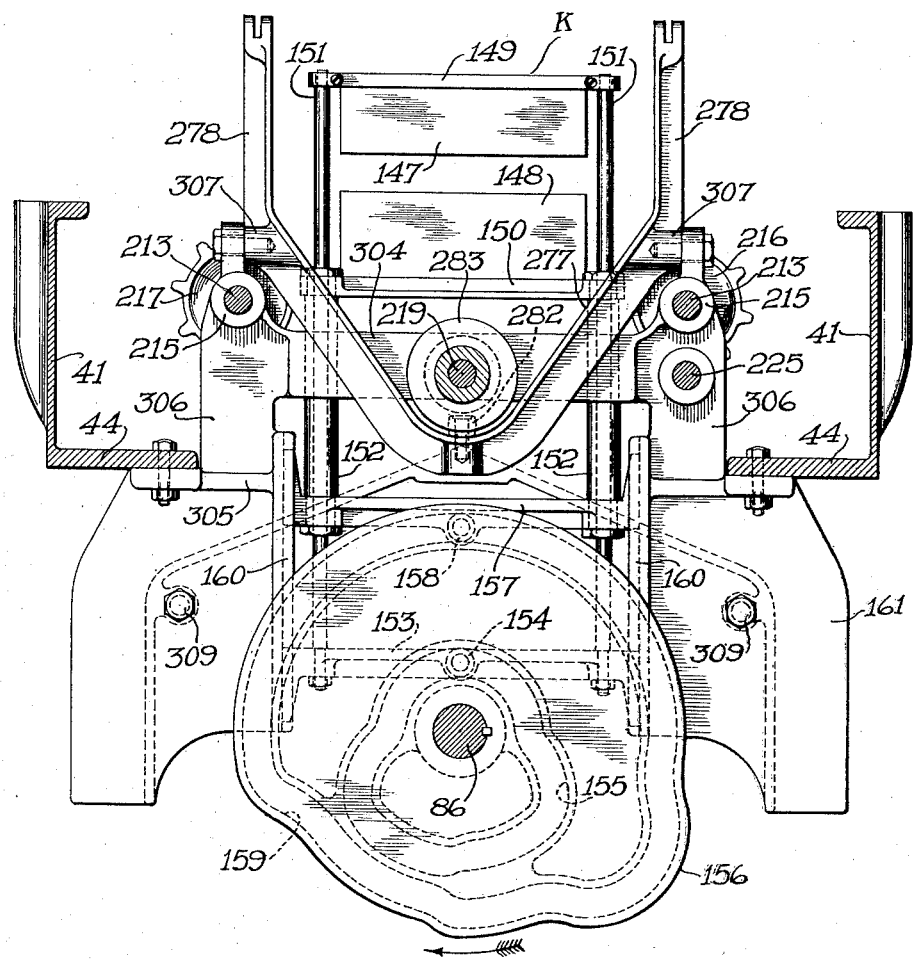

July 18, 1933.    H. R. PHILLIPS ET AL    1,918,824
MATERIAL CUTTING AND WRAPPING MACHINE
Filed Nov. 19, 1929    11 Sheets-Sheet 8
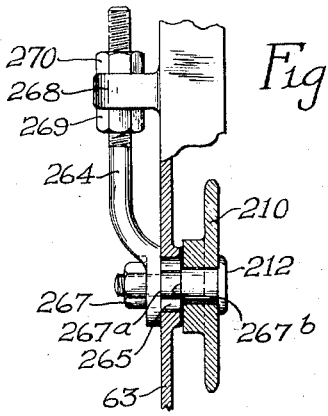
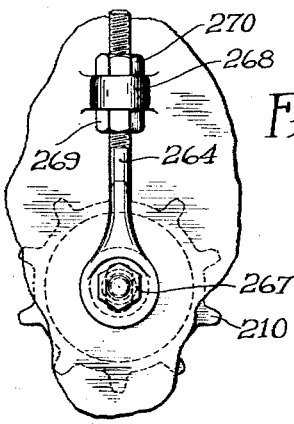
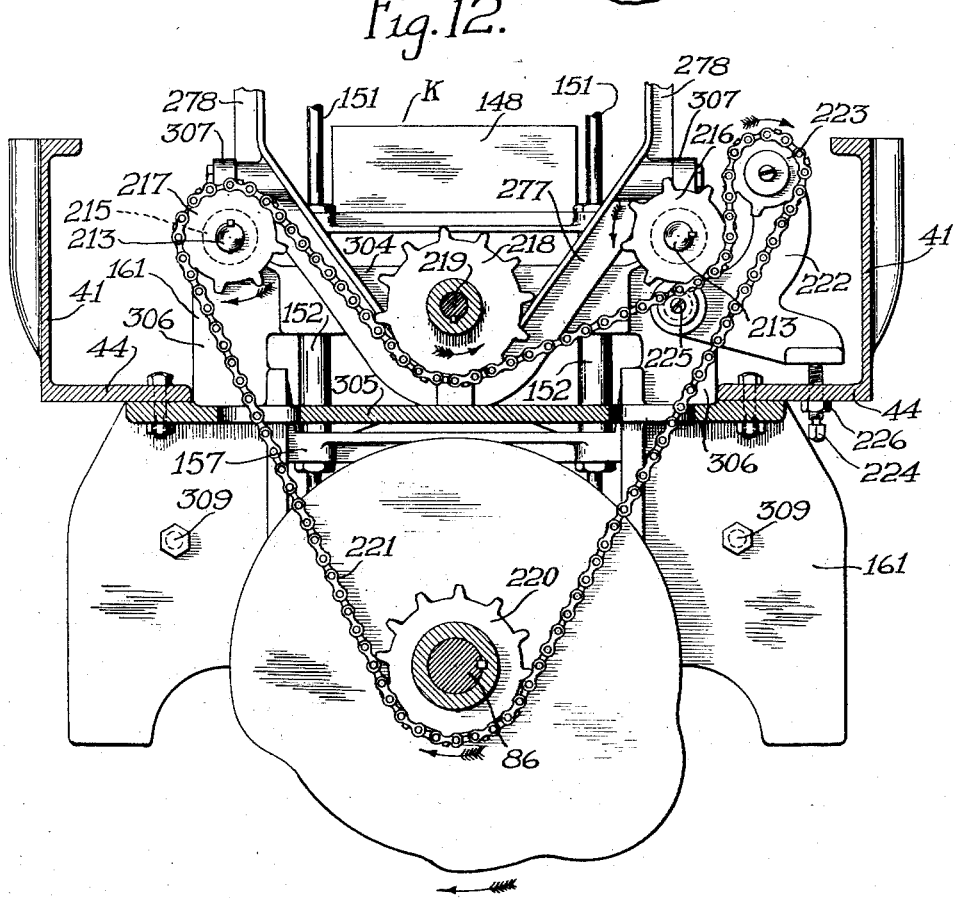
INVENTORS.
Harley R. Phillips
Henry J. Clarke
by Thomas H. Ferguson
ATTORNEY.

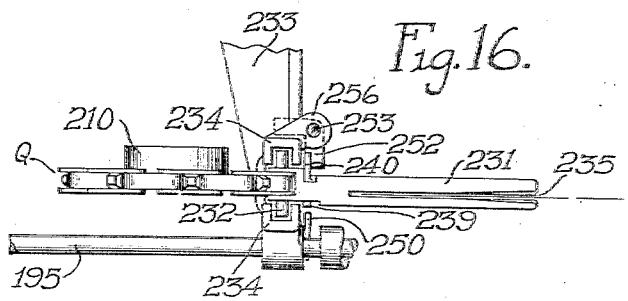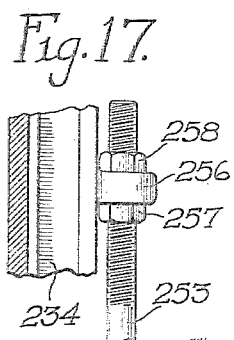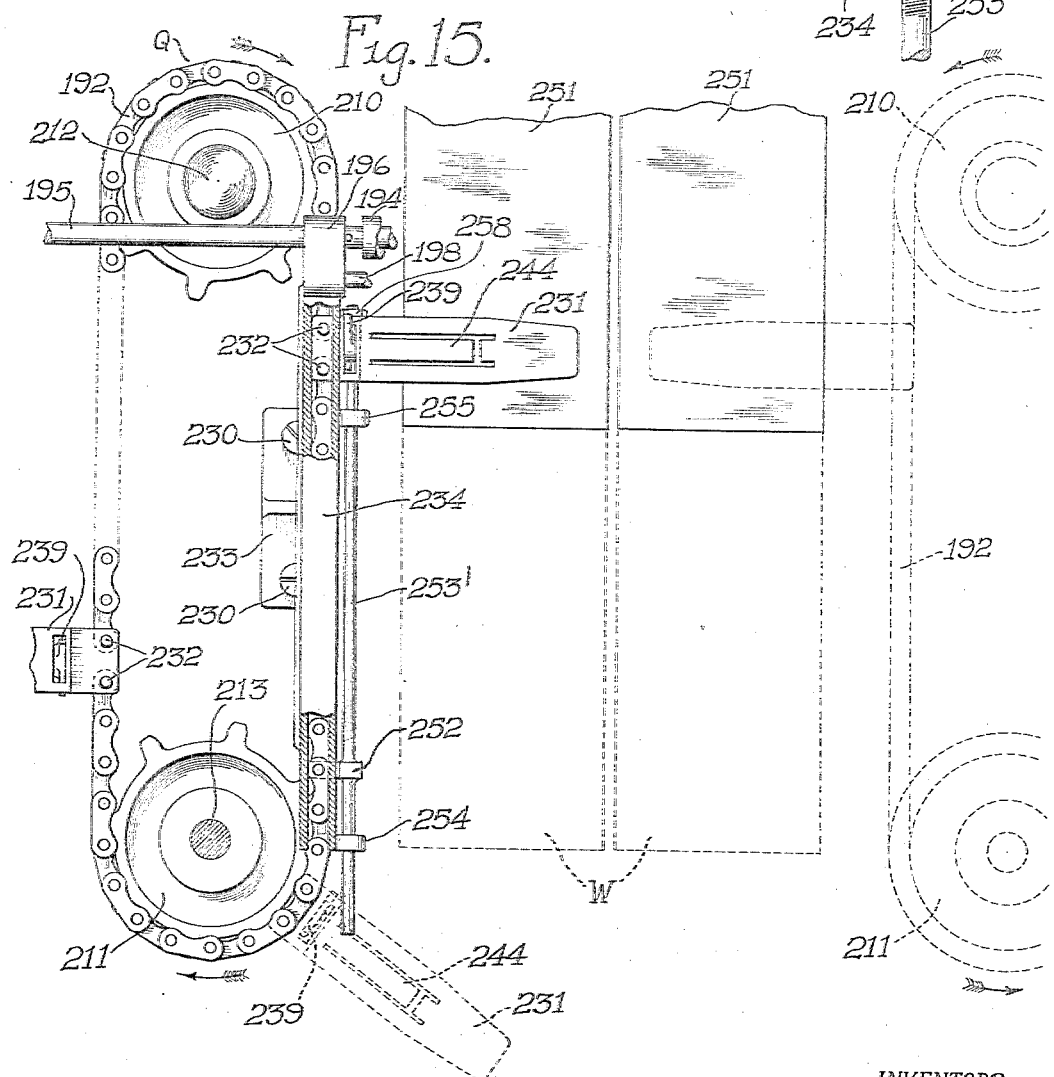

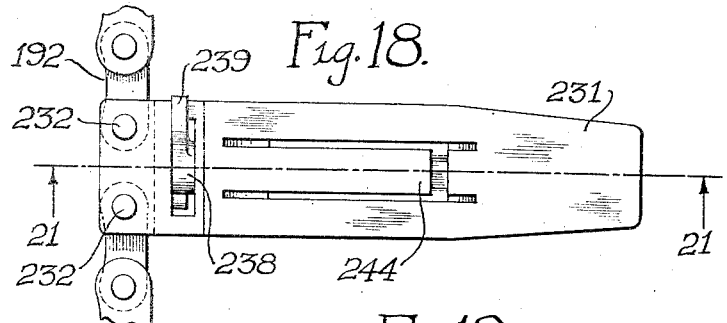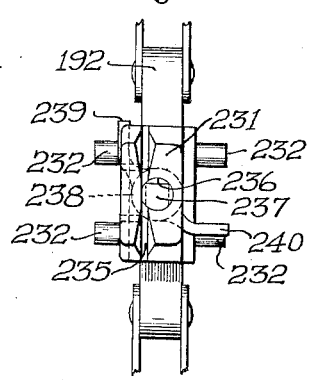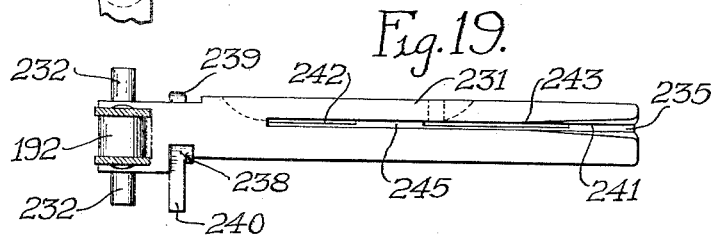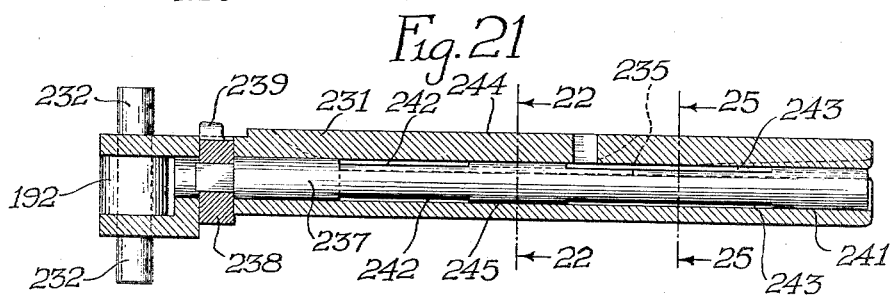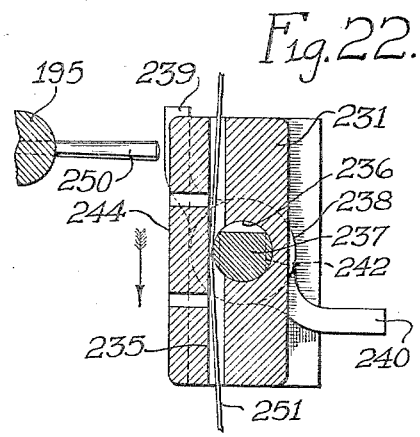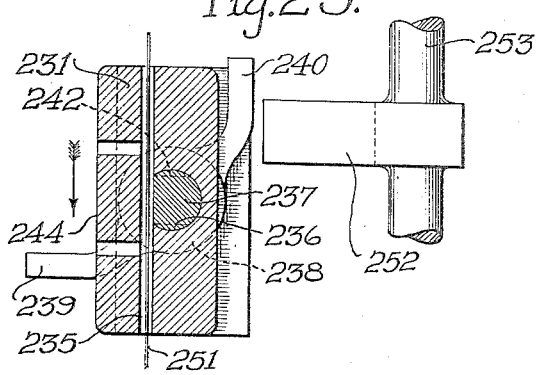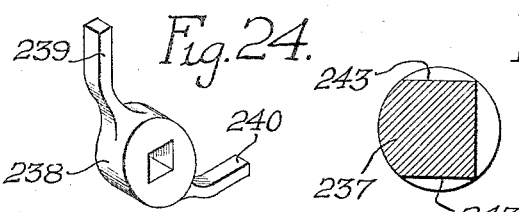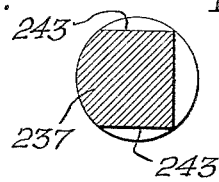

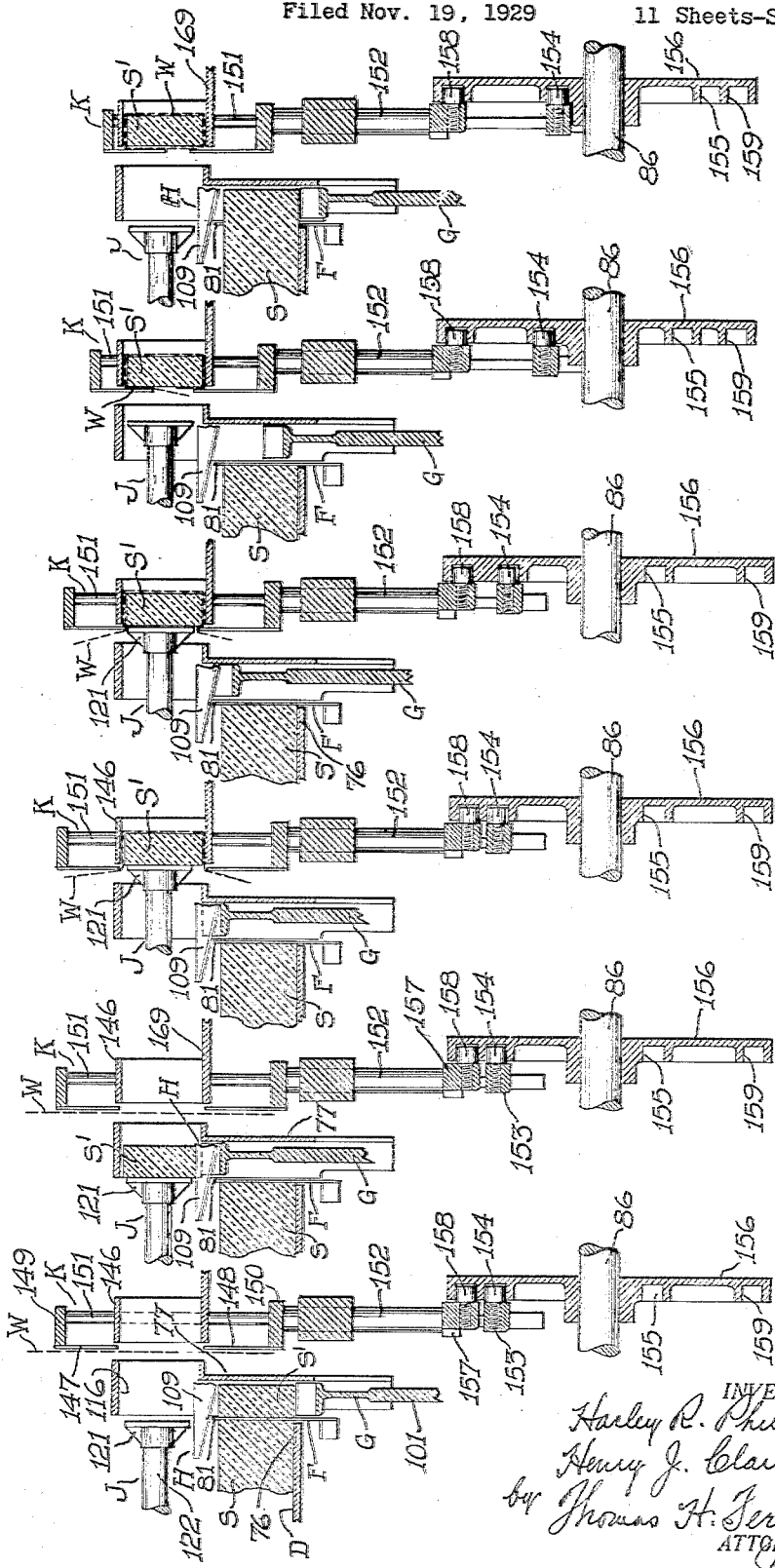

Patented July 18, 1933

1,918,824

UNITED STATES PATENT OFFICE

HARLEY R. PHILLIPS, OF OAK PARK, AND HENRY J. CLARKE, OF CHICAGO, ILLINOIS, ASSIGNORS TO MOJONNIER BROS. CO., A CORPORATION OF ILLINOIS

MATERIAL CUTTING AND WRAPPING MACHINE

Application filed November 19, 1929. Serial No. 408,368.

The present invention relates to material cutting and wrapping machines and has to do more particularly with the paper feeding, guiding and cutting mechanisms by which wrappers are supplied to the on-coming sections of material to be wrapped. The machine which we have produced is intended primarily for cutting and wrapping sections or slices of ice cream and like plastic frozen substances. Although we shall limit our disclosure to this machine, having embodied all the different features of the invention therein, it will be understood that the invention may be embodied as to all its features in various other kinds of machines and mechanisms. We therefore do not wish to limit our invention to the particular embodiment chosen for illustration, but desire it to be understood that the invention in its several aspects and features is capable of broader application and use.

The principal object of our invention is to improve prior art constructions so as to provide a machine of the class described which will meet all the requirements of commercial service. And in some places these requirements are quite rigorous. This is especially so where products are frozen very hard before being sliced and wrapped. Of course, it is desirable also to have as high a speed of operation as possible. The parts of the machine must also be simple in construction and such that they may be easily removed for repair or replacement. Then too, the cost should be kept down. These are all desirable ends which we have had in view in devising this new machine.

In attaining these objects, we have devised several new and useful features of invention.

One feature of the invention is found in the new guides by which the paper from which the wrapper sections are cut is unwound from rolls and led to the section-severing shears. Two guides are mounted side by side and are capable of limited up and down and twisting movements to adjust themselves readily to inequalities in the movements of the paper which is supplied in rolls and positioned on the machine, two rolls end to end, on a common spindle and fed therefrom in webs which pass over the guides in question.

Another feature of the invention resides in the novel retarding or tensioning device by which the feed of the paper webs is regulated. In its details this device comprises a spring pressed member in which are pockets and spring pressed plungers are located in these pockets. The plungers press the paper against the flat face of the cooperating tension member. There is also novelty in the arrangement of the tension device relative to the other parts of the guiding and feeding mechanisms. The tension device may also be thrown entirely clear of other parts so as to given ready and free access to the paper for positioning or adjustment.

In feeding the paper to the wrapping mechanism, two chains are used. These have novel web-engaging fingers. And there are novel clamping and tripping mechanisms for securing the paper to the fingers during their travel in the feeding direction and setting it free when the right point is reached. These feeding devices combine with the tension device to hold the paper webs taut so that they may be properly cut in lengths to provide proper wrappers.

In some respects, the shears for cutting off the wrapper sections are also new, the novelty residing especially in the cooperative arrangement of the blade actuating frame and the cam and other parts which come into play in actuating the shears.

We have also provided novel cleaners for the gripping fingers on the feeding chains. These are in the form of cutting blades or knives which enter into the slots of the chain fingers and cut out compacted material therein, whether product or paper or both. These knives lie in the plane of travel of the paper and therefore prepare the fingers for ready engagement with the edge of the paper which passes into the slots as the fingers approach the beginning of the feeding stroke. Positioned as they are, these cleaning blades also serve as guides to bring the slots of the fingers into register with the edge of the paper.

There are also novel details of construction and combinations of parts to provide compact assemblies both when considering portions of the machine individually and when considering it as a whole.

The several features and advantages of the invention will be best understood upon reference to the following detailed description taken in connection with the accompanying drawings wherein the aforesaid cutting and wrapping machine is illustrated. For the measure of the invention, reference should be had to the appended claims.

The machine presented herewith as embracing the several features of the invention is a development of, and an improvement upon, that disclosed in application Serial No. 190,359, filed May 10, 1927, issued March 25, 1930, as Patent No. 1,751,585.

Referring to said drawings:

Fig. 5 is a vertical section illustrating in detail the guiding means by which the slotted paper carrying fingers have their slots brought into register with the slot-clearing and guiding blades, the plane of section being indicated by the line 5—5 of Fig. 4;

Fig. 6 is a longitudinal vertical section of the machine illustrating more particularly the mechanisms at and near the wrapping position where the wrapper sections are applied to the severed slices of the material, the section being taken on a plane indicated by the line 6—6 of Fig. 4;

Fig. 7 is a vertical section through one of the plungers of the paper tension device, the plane of section being indicated by the line 7—7 of Fig. 4;

Fig. 8 is a horizontal sectional view (covering parts being removed for clearness) showing the ejector plunger, the shear operating frame and associated parts, the plane of section being indicated by the line 8—8 of Fig. 6;

Fig. 9 is a plan view of the mechanism by which the ejector plunger is operated;

Fig. 10 is a side elevation of said mechanism, the cam shaft being shown in section taken on a plane indicated by the line 10—10 in Fig. 9;

Fig. 11 is a transverse vertical section indicating more particularly the paper wrapping blades and actuating mechanism and also the shear actuating frame and its actuating cam, the plane of section being indicated by the line 11—11 of Fig. 8;

Fig. 12 is a similar section illustrating more particularly the chain gearing for driving the paper feed chains and the secondary cam shaft by which the shear-actuating frame is oscillated, the plane of section being indicated by the line 12—12 of Fig. 8;

Fig. 13 is a detail view illustrating the adjustment of one of the sprocket wheels of one of the paper feeding chains, the sprocket wheel and a portion of the adjacent structure being shown in vertical section;

Fig. 14 is a rear view of the same;

Fig. 15 is a detail view of one of the paper feeding chains and associated parts, portions of the guide being shown in vertical section and the relative positions of the paper webs and second feeding chain being indicated by dotted lines;

Fig. 16 is a top view of the chain and parts of Fig. 15;

Fig. 17 is a detail view illustrating means for adjusting the trip rod by which the paper is released from a gripping finger;

Fig. 18 is a side elevation of one of the gripping fingers and a portion of the chain to which it is attached;

Fig. 19 is an edge view of the parts shown in Fig. 18;

Fig. 20 is a view of the same parts taken from the outer free end of the finger;

Fig. 21 is a longitudinal section of one of the gripping fingers, the plane of section being indicated by the line 21—21 of Fig. 18;

Fig. 22 is a transverse section of one of the gripping fingers in closed position, the section being indicated by the line 22—22 in Fig. 21;

Fig. 23 is a similar view illustrating the gripping mechanism of the finger in open position;

Fig. 24 is a perspective view of the actuating arm on the cam rod of one of the gripping fingers;

Fig. 25 is a transverse section taken through a non-engaging portion of the cam rod, the plane of section being indicated by the line 25—25 of Fig. 21; and Figs. 26 to 31 inclusive are diagrammatic views illustrating successive steps in the operation of severing a slice of material from the end of the slab and wrapping the same with a severed wrapper.

Throughout these views, like characters refer to like parts.

Figure 1:
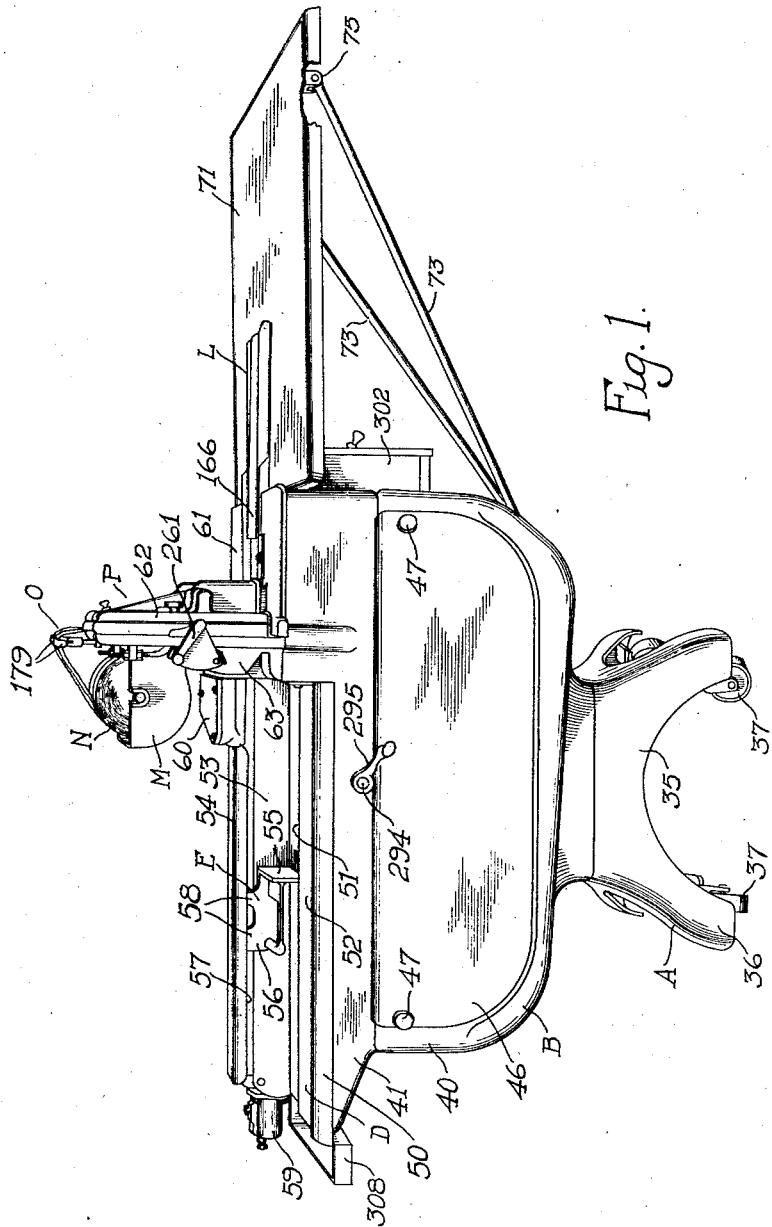
Fig. 1 is a perspective view of the aforesaid ice cream cutting and wrapping machine which, as before noted, embodies all the features of the invention.

Referring to said drawings in detail, A designates the pedestal of the machine; B the main casing, mounted on the pedestal; C the power mechanism including the main cam shaft and other parts located within the casing B; D the feed table upon a portion of the casing B; E the follower which presses behind the slab of material to advance it step by step over the table D; F the cutting mechanism by which the slices are severed from the end of the slab; G the elevator mechanism by which the severed slice is forced upward; H the secondary knife mechanism for dividing a severed section as it is moved upward by the elevator G; J the ejector mechanism by which a divided severed section is removed from the elevator and forced against the paper wrapper into the folding mechanism; K the folding mechanism which cooperates with the mechanism J to wrap sections of paper about the divided slices; L the delivery chutes on to which the wrapped pieces are advanced step by step by the oncoming newly wrapped pieces; M the holder for the wrapper paper; N the rolls of paper in said holder, the same having their ends drawn off for delivery to the folding mechanism K; O the guides for yieldingly supplying and guiding the webs of paper from the rolls N; P the tension device for applying tension to webs of paper as they are advanced toward the wrapping mechanism K; Q the chain feed mechanism, the same having gripping fingers for engaging the webs of paper to advance them downward into wrapping position; R the cleaning and guiding blades for removing accumulations from the slots of the gripping fingers; and T the shears by which the ends of the webs are severed to provide the wrappers for the material to be wrapped.

The pedestal A may be variously constructed but preferably comprises an upper frame portion 35 and four legs 36, the latter being provided with castors 37 for convenience in shifting the machine from place to place.

The main casing B likewise may be constructed in various ways. Preferably it includes an outer shell having an inclined bottom 38 having an opening 39 at its lowest point. The purpose of this bottom and opening are to collect and withdraw any oil or other deposits which may fall from the machine parts within the casing. Ordinarily the opening 39 is capped and from time to time the cap is removed and the accumulations in the casing drawn off into a suitable receptacle and removed from the machine. The casing B is provided with strengthening webs and flanges and these are used for securing transverse frames which in turn serve to support the various mechanisms within the casing.

Preferably the casing B comprises a lower portion 40 and an upper portion 41 which may be secured together in any suitable way, as by bolts 42 extending through mating flanges 43 and 44 upon the lower and upper portions 40 and 41 respectively. The transverse frames are secured to the casing members 40 and 41 at various points as we shall see hereinafter when considering the mechanisms mounted upon them. The casing B is provided on one side with a large opening 45 which is normally closed by a cover 46, which is held in place by any suitable means as by screws 47 passing through openings in the cover into engagement with threaded openings in the member 40. The screws 47 preferably have knurled heads so that they may be easily turned by hand when it is desired to remove or replace the cover 46 upon the casing.

The table D forms a cover for a portion of the upper member 41 of the casing B. This cover includes a central portion 51 which is depressed with reference to the adjacent portion 52 and thus forms a slight channel along which the slab of ice cream or other material is advanced. At the left of the channel is a vertical wall 53 which serves as a guide for the slab as it travels. The wall 53 also serves as one wall of the elongated casing 54 which ordinarily contains mechanism for advancing the follower E step by step as it in turn advances the slab. In the present instance, this mechanism is omitted as it forms no part of the invention covered by the present case.

At the right of the more elevated portion 52 is a flange or web 50 which keeps drippings from passing over that side of the table. This flange extends both above and below the table surface, as clearly shown in Fig. 6.

For the purposes of the present disclosure, it will be sufficient to advance the follower E by hand in timed relation with the movements of the mechanism of the machine. Accordingly the follower is shown as a simple block having an abutting face 55 which extends at right angles to the direction of travel of the follower and is adapted to abut against the rear end of the block of material. As shown, projecting ends 58 of the vertical portion 56 of the follower extend through the slot 57. With the hand operation of the follower, the parts 58 are merely guided by the slot 57 and do not have any connection with mechanism within the casing 54. An extension casing 59 is also shown in line with the casing 54, but this need not be described as the same has to do with the automatic feed mechanism which is not made a part of the present disclosure.

Besides the table top D and its associated parts just described, there is an enclosing casing 60 for the ejector mechanism J. Furthermore, there is a top 61 for that portion of the casing B which is on the delivery side of the machine. This latter top is associated with a casing member 62 which cooperates with a similar casing member 63 to enclose the paper feed mechanism, the paper shears and other parts. These casing members may be variously constructed and need not be described in further detail.

On the delivery side of the casing B is a table 71 preferably composed of metal and having a peripheral flange by which it is secured to the member 41 of the casing B. In the present instance, bolts 72 with suitable nuts perform this function. The outer end of the table 71 is supported by a pair of rods 73 which are secured at their inner ends to two suitable projections 74 upon the member 40 and at their outer ends to similar projections 75 upon the under side of the table 71.

As the slab of material, such as the slab S of Fig. 6, is advanced by the follower E, its forward end is extended beyond the forward edge 76 of the table D a given distance depending on the extent of movement of the follower. Were these movements made by mechanism, the advance steps would be the same for any given setting. When made by hand, they may not have the same equality but for the purposes of the present disclosure, it will suffice to depend upon manual operation and the skill of the operator to provide steps of the right length. Obviously, the forward end of the slice may be pushed against the wall 77 adjacent to the elevator G and if this be done each time, then the slices removed from the end of the slab would be of equal thickness. But as we have said, the skill of the operator may be relied upon to provide slices of less thickness with a fair degree of uniformity.

Having pointed out the way in which the slab is advanced to present a portion beyond the end of the table edge 76, we may now consider the mechanism by which the slice is cut off. This is the cutting mechanism F. This mechanism includes two cutting blades 81 which move laterally toward and from each other and meet along a vertical central line. They are mounted on arms 82 which have intermeshing toothed segments 83. These arms are mounted respectively upon stud shafts 84 and 85 extending parallel to the main cam shaft 86 and mounted in suitable bearings in the transverse frame 87 which is secured to the casing members 40 and 41 in any suitable way. One of the arms 82 is provided with an extension 88 having a cam roller 89 which travels in a cam track 90 upon a cam 91 mounted upon cam shaft 86 and rotating in the direction indicated by the arrow adjacent thereto in Fig. 4. Cam track 90 is shaped so as to produce one complete to and fro movement of each of the knives 81 during a complete rotation of the cam shaft 86. As clearly shown, blades 81 are secured to the arms 82 by a series of screws 92. By means of such a connection, it is possible to replace the blades 81 while at the same time employing relatively thin blades with a substantial structural backing. This stout structure is required in order to enable the cutting mechanism to properly slice ice cream that is frozen in slab form to a very low temperature. The intermeshing teeth 83 insure equal rotary movements of the blades 81 upon each rotation of the cam shaft 86. Suitable adjustments may be provided for the blades 81 but such are not claimed in this case and therefore are not shown.

Having severed a slice from the end of a slab, the slice is then moved upward by the elevator mechanism G. This mechanism includes a flat vertical member 101 having a slotted head 102 at its upper end. The edge portions of the member 101 are fitted to move freely up and down in guides 103 formed on the transverse frame 100 which is shaped to fit against the frame 87 and to be secured with the same to the casing B when the parts are assembled. The lower end of the member 101 is provided with a cam roller 104 which travels in a cam track 105 upon elevator cam 106 secured to cam shaft 86 which rotates in the direction indicated by the arrows of Fig. 4. The track 105 is shaped so as to give the elevator an upward movement and to hold it in its uppermost position for a short period, then lower it to its lowermost position and there hold it for about a half revolution of the shaft 86. The cam 106 is angularly positioned on the shaft so as to cause the elevator to travel upward after the slice has been severed from the slab.

As the slice moves upward, it encounters one or more knives of the mechanism H which divide the severed slice into parts. In the illustration shown, there are three knives, two of which, designated 107 and 108, are out of service and the third of which, designated 109, is in service. The knives 107 and 108 are mounted upon a transverse rod 110 so that they may be rotated down into slots 111 and 112 respectively formed in the wall 77. When the knives 107 and 108 are in these slots, they are out of the path of travel of the severed slices and consequently do not operate on them. The center knife 109 is fixed at its ends so as to lie across the path of travel of the slice and hence upon the upward movement of the slice, the same is divided into two parts. In order to move the lower edge of the slice completely beyond the fixed knife 109, and beyond the knives 107 and 108 when they are all in service, the upper portion 102 of the elevator is provided with three slots 113, 114 and 115 into which the knives 107, 109 and 108 respectively pass.

The elevation of the slice beyond the dividing knife mechanism H completes the cutting of the material and places it in condition to be wrapped. In other words, no more cutting is to take place. As the divided slice stands in elevated position, it is protected by the housing 116 secured to casing member 63. In such position it is ready to be removed from the elevator by the plunger 121 of the mechanism J. This plunger is given a reciprocal movement in timed relation with the other parts so as to carry the divided slice toward the delivery side of the machine clear of the elevator. The stem 122 of the plunger extends through the tubular bearing 123 formed in the structure of the casing 60. The upper portion of the bearing 123 is provided with a slot 124. A pin 125 passes through this slot into the stem 122 to which it is fixed. The upper end of the pin 125 is pivotally connected to one end of a link 126. the other end of the link 126 is connected by pivot pin 127 to the outer end of a crank arm 128. All these parts lie within the casing 60. The pivot shaft 129, upon the upper end of which arm 128 is secured, extends downward through the frame structure to a point adjacent to the main cam shaft 86. There it is provided with a crank arm 130 which is pivoted at its outer end to sliding yoke 131 which straddles cam shaft 86 and bears in a groove 137 formed in the hub of the ejector cam 138 fixed to the shaft 86. A cam roller 139 travels in a cam track 140 upon the adjacent face of the cam 138 with the result that the bifurcated member 131 is reciprocated to and fro, there being one complete to and fro movement for each rotation of the shaft 86. These reciprocations are transmitted through arm 130 and pivot shaft 129 to arm 128 and from the latter to plunger 121. The cam 138 is set upon shaft 86 so as to give the reciprocations of the plunger in proper timed relation to the movements of the elevator and other parts.

The wrapping mechanism K includes a tubular opening 146 into which the divided slice is shoved by the plunger 121 of the ejector mechanism J. This tubular portion is of the same outline as the slice of material and cooperates with the plunger 121 in folding the wrapper about three faces of the slab. This is shown more particularly in Fig. 28 where slice S' is shown partially enveloped by the wrapper W. As shown in Fig. 27, the wrapper is presented at the open end of the tubular portion of 146. Then the plunger 121 presses slice S' against the wrapper W and forces it into the position shown in Fig. 28.

The mechanism K also includes folding blades 147 and 148 mounted upon heads 149 and 150 respectively. The head 149 is secured at its ends to the upper ends of upright rods 151 which pass down through tubes 152 and are provided at their lower ends with a similar head 153 which has, at its center, a cam roller 154 which travels in a cam track 155 upon cam 156 keyed to the main cam shaft 86. The blade head 150 is similarly secured at its ends to the upper ends of the tubes 152 and the lower ends of these tubes are similarly connected together by a head 157 which carries, at its center, a cam roller 158 which travels in cam track 159 of cam 156 which rotates in the direction indicated by the arrow of Fig. 10. The heads 153 and 157 project at their ends into grooves in vertical guides 160 carried by the transverse frame member 161 suitably secured to the flanges 44 of the casing member 41.

An inspection of the cam tracks 155 and 159 shows that during a portion of the rotation of the shaft 86, the blades 147 and 148 are moved toward each other and during the balance of the rotation of the shaft 86, they are drawn apart and maintained apart. The cam 156 is mounted upon the cam shaft 86 in such position relative to the other cams upon said shaft that the folding operation produced by blades 147 and 148 will occur after the wrapper W has reached the position shown in Fig. 28. The first movement of the blades toward each other is followed by a period of rest and then there is a further movement of the blades toward each other. The first movement brings the wrapper W into the position shown in Fig. 29 and there the blades come to rest and hold slice S' in the position shown until ejector plunger 121 is pulled away from the slice S'. By this holding of the slice, any tendency of the slice to be drawn back by reason of sticking to the plunger, is prevented. Subsequent rotation of the cam 156, causes the lower portion of the wrapper W to be pressed against the slice and then over this the upper portion of the wrapper is pressed. These relative positions of the parts of the wrapper are shown more particularly in Fig. 30. The final inward movement of the blades brings the wrapper into its final position. This is the position shown in Fig. 31. As these various steps take place, the slab S is again moved into position to have the second slice S' cut from it as illustrated in Fig. 26, where the slice is shown cut but not elevated. In Fig. 27 the slice is shown elevated and ready for the action of the plunger 121 as before explained.

As the sliced parts are wrapped, they accumulate in two rows. They at first rest on the floor of the tubular portion 146 and then as the plunger 121 presses upon the rearmost of the series of wrapped pieces, the foremost are pressed against the sharp point 166 of the chute structure L. This structure includes two channels 167 and 168 which are mounted at their receiving ends in a suitable frame 169 secured to the top 61 of the machine by any suitable means, as screws 170. It is the frame 169 which has formed with it the tubular structure 146. When member 169 is removed from the top 61, it therefore carries with it both the rectangular frame 146 and the chutes 167 and 168. It may be noted that in Fig. 8 the various parts beneath the covering members 61 and 169 are shown, that member with the attached frame and channels being removed to show the parts more clearly. The channels 167 and 168 are set at a slight angle to each other so that, as the divided slices with their wrappers upon them are presented to the point 166, the latter will divide the stream of slices into two streams of half-slices, one half-slice stream passing outward through the channel 167 and the other passing outward through the channel 168. These channels terminate at their outer ends in a level slightly above that at their inner ends and also above. Their delivery ends are sufficiently above the table to permit cartons to be slipped over them individually for the purpose of receiving the oncoming streams of wrapped pieces. The operators handle the cartons and the wrapped product closing each carton when it is full and placing another in position to receive its supply. In lieu of employing cartons which may be slipped over the ends of the channels 167 and 168, the operators may remove the wrapped pieces as they enter upon the channels and place them in containers of a different type. Often containers of the shoe box type are employed and the wrapped pieces are removed in stacks and placed in these boxes. Obviously, any desired way of handling the product will suffice. What is here stated is merely illustrative and suited to the structure of the chutes disclosed.

In our description heretofore we have not explained how the wrapper W is presented to the folding mechanism K. This may now be done. The upper portion of the machine, namely that embracing the casing members 62 and 63, is provided with a holder M. This holder or paper container, is semi-cylindrical and has its open side uppermost. It is of sufficient length to hold two rolls N of the paper. It comprises ends 174 and a circular wall 175. The ends are provided with bearings 173 concentric with the circular wall 175 and adapted to receive the spindle 176 upon which the two rolls N are secured. From these rolls the paper is adapted to be drawn off in webs from the rolls through guides O and thence on downward to a position where wrapper sections are cut off as we shall presently see.

The upright guides O are substantially identical and each comprises a member 177 having an upper smooth bearing surface 178 substantially parallel to the spindle 176 of the positioned rolls N. The surface 178 is bridged by a bail or strap 179 secured at its ends to ends of the member 177. A space 180 between the surface 178 and the bail 179 is provided for the passage of the web of paper. This space is therefore slightly greater in length than the width of paper. The member 177 is secured to the upper end of a stem 181 and the latter extends through apertured lugs 182 and 183 upon the supporting casing member 63. These constitute guides for the slight up and down travel of the stem. A transverse pin 184 extends through stem 181 and between the pin 184 and the upper face of the lug 183 is a coiled compression spring 185 which normally presses the pin 184 upward against the under face of the lug 182 and thus tends to keep guide 177 in its uppermost position. Any unevenness in the pull upon the web of paper will cause the spring 185 to yield slightly and thus the paper is held reasonably taut without danger of rupturing it by reason of uneven or excessive pulls upon it.

Besides the two guides 177 yielding in this way, they are connected by a short chain 186 of the flat link type which has only a slight lateral movement. The elongated guiding surfaces 178 on both members 177 are held in substantial alignment with each other but both of them may independently yield in case the strains upon their respective webs should require it. There may be either slight twisting or rotary movements of the stems 181 or relative up and down movements of the individual guides themselves. By this mechanism, the two webs fed from the rolls N are independently guided with a considerable range of yield to accommodate the paper being fed.

After the paper passes over the guides O, it passes between a flat surface on the face of the wall 63 and the surface of a pivoted tension member 191 which exerts a general yielding pressure upon the passing paper. This is the tension device P. The member 191 is shaped so as to lie near the paths of travel of the feeding chains 192 of the feed mechanism Q. This makes the shape of the member 191 in elevation somewhat triangular. The lower portion of the member 191 is provided with a hub 193 having apertured bearings 194 through which a transverse supporting rod 195 extends. The latter is journaled for rotation in fixed bearings 196 upon a portion of the frame of the machine. A coiled tension spring 197 bears at one end against a portion of the hub 193 and at the other end against a pin 198 fixed to the machine. This spring is under tension sufficient to press the tension member 191 firmly against the cooperating face of the member 63. Thus the pivoted tensioning member is yieldingly held in paper engaging position. Although the rod 195 is capable of rotation, yet this rotation does not affect the tension of the spring 197.

The member 191 not only exerts a general retarding influence upon the paper but also tensions it locally by means of plungers which are yieldingly seated in recesses in the face of the member. One of these auxiliary tensioning devices is shown in detail in Fig. 7.

As there shown, the member 191 is provided with thickened portions or bosses 199 which provide material for the formation of pockets or recesses 200 on the paper side of the member 191. In each of these recesses 200 is a plunger 201 which is firmly pressed outward by a coiled spring 202 positioned within the recess 200 about the stem 203 of the plunger and bearing at one end against the under side of the plunger and at the other end against the bottom of the recess. Each plunger stem 203 extends through an aperture in the boss 199 and is threaded at its outer end for the reception of a nut 204 which may be positioned so as to limit the outward movement of the plunger 201. This is done by nut 204 engaging an adjacent face of the boss 199. By adjusting the nuts 204 upon the different stems 203, it is possible to vary the tension applied to the webs of paper at different points in its width to suit the conditions of the paper, atmosphere and the like prevailing at the time. By means of the local plunger control either edge of either web may have the tension upon it increased or decreased by simply varying the position of the nut 204, upon the stem of the corresponding plunger 201, thus varying the throw of the plunger. Great nicety of adjustment can be obtained by means of the general yielding of the spring 197 and the local yielding of the several springs 201 at different points in the widths of the paper webs passing through the device. By pulling back upon the member 191 to rock the same about its pivot rod 195 all tension may be removed from the paper and the latter may be torn off, adjusted or otherwise manipulated as desired and all this may be done freely and readily. In its open paper-exposing position all parts of the tensioning member 191 are distant from the paper far enough to leave the latter quite accessible for such hand treatment and adjustment.

Figure 2:
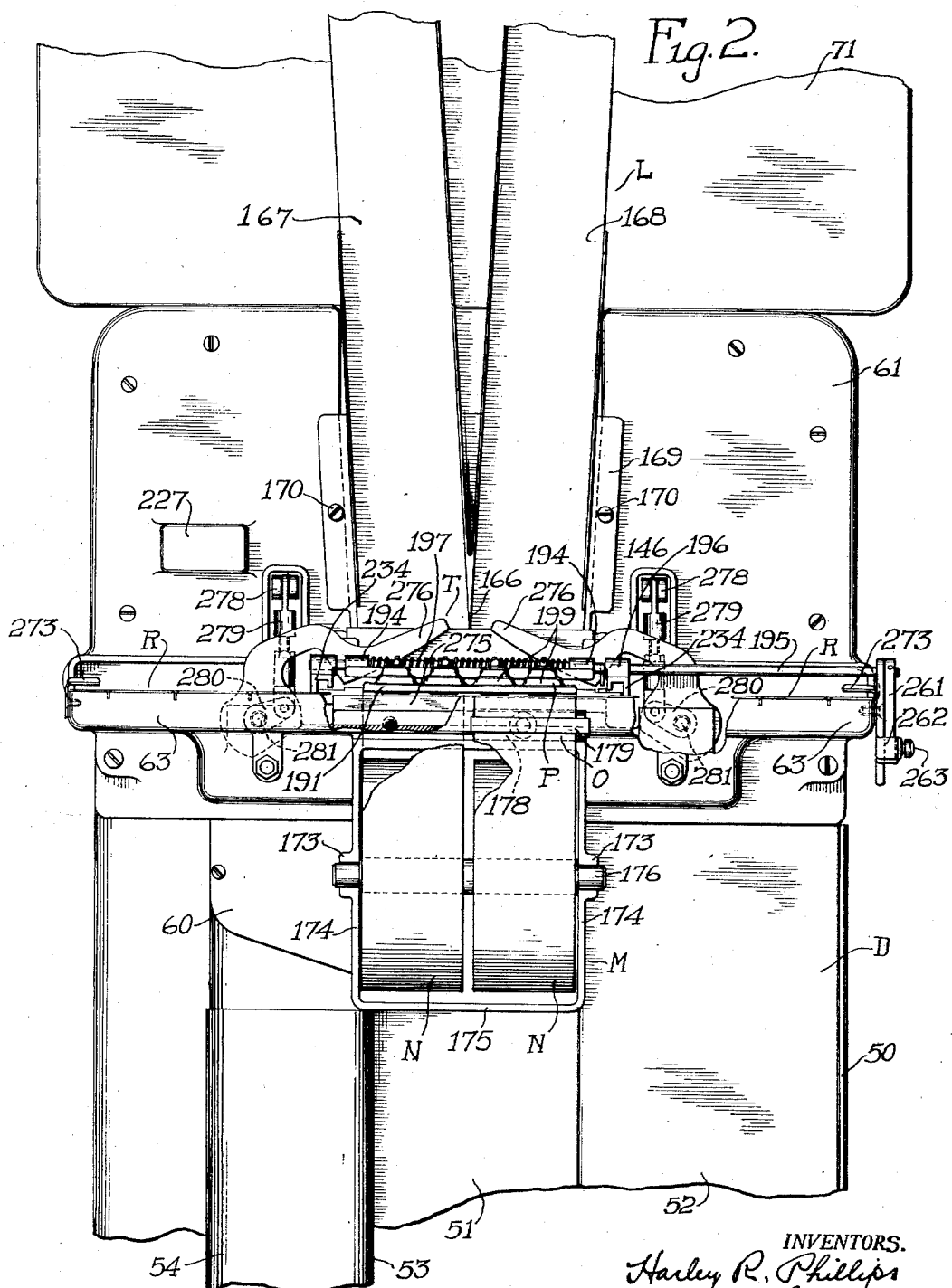
Fig. 2 is a plan view of the central portion of said machine illustrating more particularly the material feeding table, the paper rolls, the shears for cutting off the wrapper sections and the delivery chutes.
Figure 3:
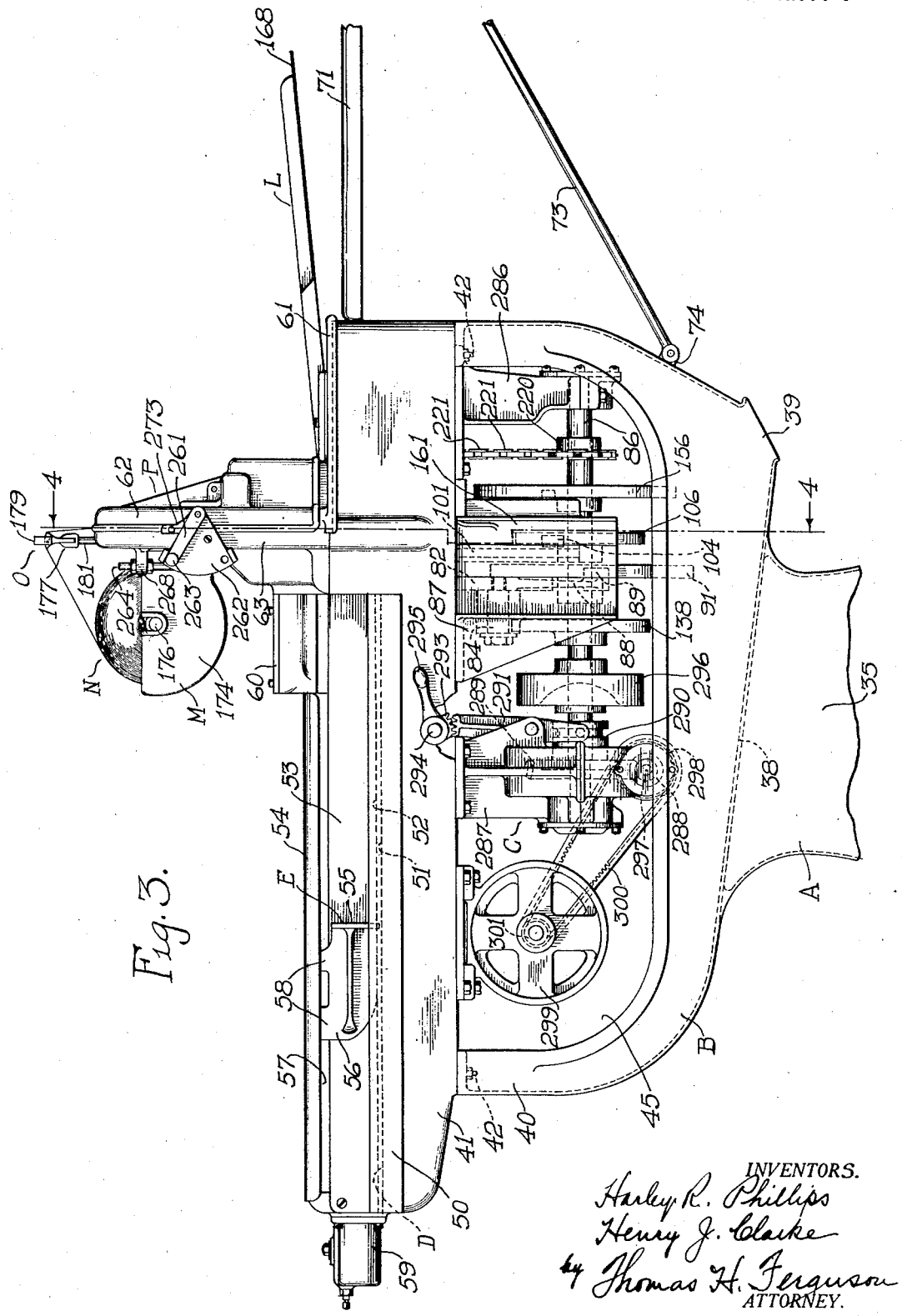
Fig. 3 is a side elevation of the machine, portions of the pedestal and delivery table being broken away, and the cover on the side of the casing removed to show the driving motor cam shaft, cams and other power mechanism.

After passing the tension device P, the paper webs come within the range of action of the chain feed mechanism Q. In the case of this mechanism, two chains 192 respectively pass over upper sprocket wheels 210 and lower sprocket wheels 211 mounted respectively on shafts 212 and 213. The former are stud shafts adjustably secured to and projecting from the casing member 63. The shafts 213 are short shafts journaled in bearings 215 formed in transverse frame 161. The shafts 213 are provided with driving sprocket wheels 216 and 217 which are in the same plane as driving sprocket wheel 218 upon secondary cam shaft 219 and driving sprocket wheel 220 upon primary cam shaft 86. The sprocket chain 221 engages and travels over these driving sprocket wheels in the manner shown in Fig. 12, directions of travel and rotation being indicated by the several arrows of that figure. Thus, the feeding chains are driven from the main cam shaft 86. As a result of this arrangement, the inner stretches of the chains 192 move downward and the outer stretches upward. To maintain the sprocket chain 221 sufficiently taut, we have provided a chain tightener comprising a pivoted frame 222 carrying a journaled sprocket wheel 223 in engagement with the chain. Rocking the frame 222 varies the tension of the chain 221. The frame 222 is held in proper adjusted position by adjusting screw 224. This screw extends through a threaded opening in flange 44 of the frame member 41 and abuts against a portion of the frame 222, distant from its pivot 225. A lock nut 226 serves to hold the screw 224 in adjusted position. The frame 222 and the sprocket wheel 223 extend upward beyond the level of the upper edge of the casing frame 41, consequently the cover 61 is provided with a box-like extension casing 227 which fits over these parts of the tightener to protect them. This extension is shown in Fig. 2.

Figure 4:
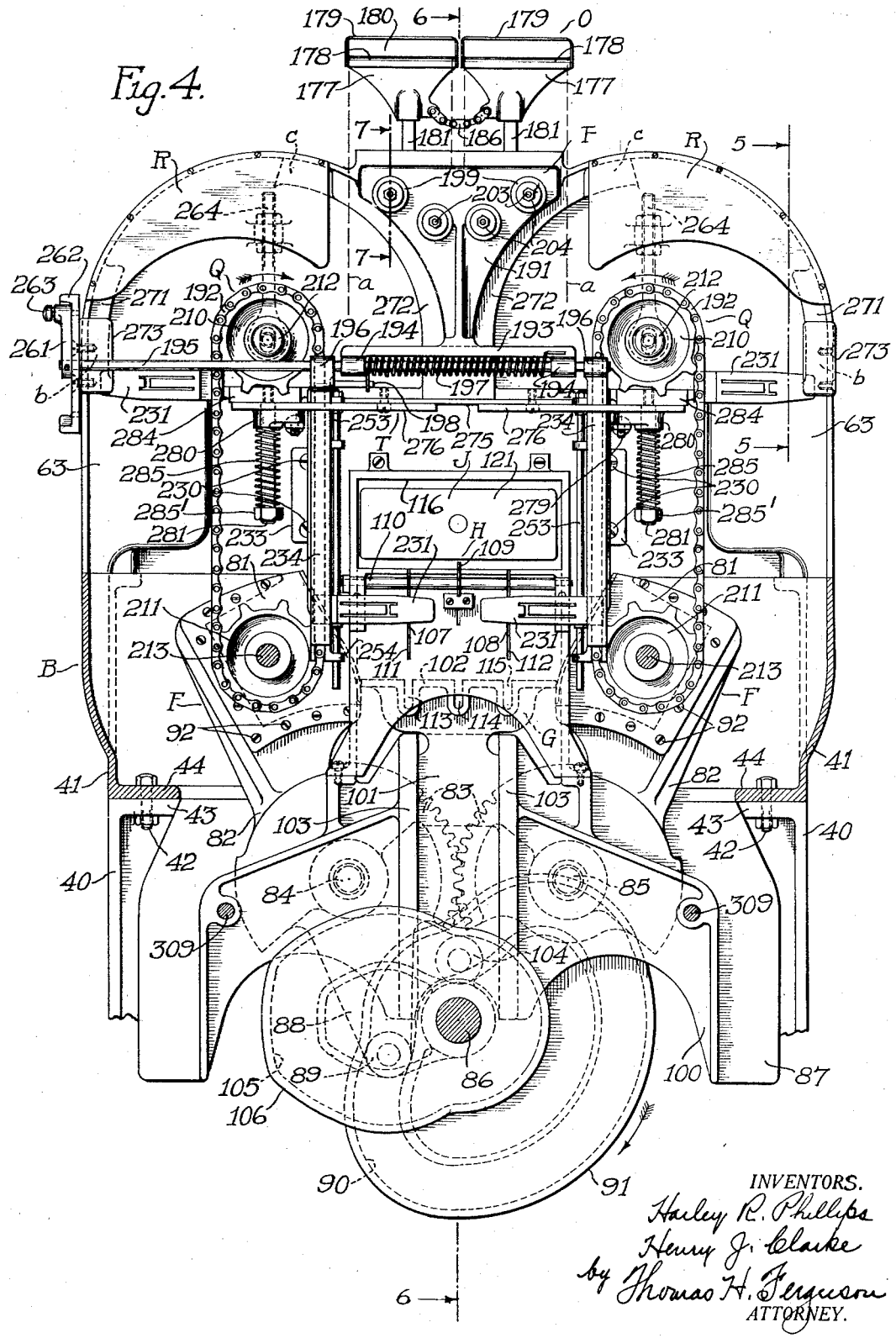
Fig. 4 is a transverse vertical section of the machine taken on the plane indicated by the line 4—4 of Figure 3.

Since the chains 192 are to pull upon the paper to feed it downward, as indicated by the arrows in Fig. 4, they must be provided with suitable means for gripping the paper at the beginning of the downward stroke, holding it during such stroke and then releasing it at the end of such stroke. For this purpose, we employ the gripping finger mechanism illustrated more particularly in Figs. 16 to 25 inclusive, the general assembly being illustrated more particularly in Fig. 4. Preferably, there are but two fingers 231 on each chain and each finger comprises an elongated body which is connected into the structure of the chain 192. To provide this connection, one end of the body 231 is transversely grooved and the projecting ends are apertured for the passage of the usual chain pivots, the end of the finger taking the place of a double link in the chain. The pivots 232, employed for this purpose, are longer than the usual chain pivots and are made so for guiding purposes. Each extends at its ends into channels formed within a lengthwise of vertical guides 234 fixed to the machine frame in position to guide the fingers as they pass through the feeding stretch. By the use of these guides 234, the fingers 231 are held against displacement as they travel to feed the paper. The guides 234 are provided with bracket extensions 233 which have flat leaves secured to the flat face of the adjacent casing member 63 by any suitable means, such as the screws 230.

As clearly shown each finger 231 is provided with a longitudinal slot 235 which is adapted to travel in the plane along which the paper is fed and each slot is widened a little and tapered at its open end to more readily take in the paper sheet. Within the body of the finger is a longitudinal bore 236 in which is positioned a cam rod 237 having secured to its other end a member 238 having lugs 239 and 240 which are actuated to rotate the rod 237. The connection is preferably made by squaring the end of the rod and fitting it into a square hole in the member 238, as clearly illustrated. The rod 237 is circular in cross section at two points in its length to provide cam surfaces 241 and 245. At points inward of these, it is cut away so as to provide portions 242 and 243 which will not engage the paper in the slot 235 when the rod 237 is rotated by actuation of the lugs 239 and 240. The cam portion 245 and the adjacent nonengaging portion 242 cooperate with one portion of the web of paper. The other cam portion 241 and non-engaging portion 243 cooperate with another portion of the same web. These various parts in their open position are shown perhaps most clearly in Fig. 20.

In order to provide for a reasonably heavy pressure upon the different portions of paper web at the points where it is engaged by the cam portions 245 and 241, that member of the body 231 which does not contain the cam rod 237, is slitted so as to provide a tongue 244 which cooperates with the cam surface 245 in the same way that the outer end of the same half of the finger cooperates with the cam surface 241. By this treatment of the paper gripping finger 231, a uniform pull is obtained upon two properly spaced points in the transverse dimension of the web.

As one chain 192 travels downward and acts upon one web of paper, the other chain 192 travels downward in like manner and acts upon the other web of paper. Thus two webs are advanced step by step and as we shall see later, cut off to form wrappers for the divided portions of the slice of material to be wrapped. In Fig. 15 the relative positions of the chains and intervening paper webs are shown by indicating the second chain 192 and sprocket wheels 210 and 211 in dotted lines. The ends of the paper strips 251 which are cut off to form the wrappers W are also shown in dotted lines in the same figure.

To bring about the rotation of the cam rod 237 at proper times to clamp the paper, as shown in Figs. 18 to 22 inclusive, and to free it, as shown in Fig. 23, provision is made for engaging and actuating the lugs 239 and 240, respectively. To shift the rod 237 to clamping position, we employ a pin 250 which extends outward from the rod 195 into position to engage the lugs 239 of the different fingers as they travel past it in the direction indicated by the arrow in Fig. 21. Thus, as the finger 231 reaches the web of paper with which it cooperates, the web passes into the slot 235 and by the time the finger reaches the pin 250 it extends at right angles to the path of travel of the paper and is in readiness to be clamped to it. The engagement of lug 239 with pin 250, then rocks cam rod 237 into the clamping position illustrated in Fig. 21. This engagement occurs when finger 231 is a little above the full line position of Fig. 15. The continued advance of the finger 231 draws upon the paper 251 and carries it downward. This movement continues until the clamping rod 231 is forced out of clamping position into the open position shown in Fig. 23 wherein the paper 251 is freed. This latter movement of cam rod 237 is brought about by a projection 252 upon vertical rod 253 engaging lug 240 to rock the finger 237 as the finger travels in the direction indicated by the arrow in Fig. 23. This lug is located near the bottom of the feed stretch of the chain and consequently frees the paper when a sufficient portion of it has been advanced to provide a wrapper W. This tripping of the finger 231 occurs when it is a little above the dotted line position of Fig. 15, at a point before it has begun to turn about the wheel 211.

The position at which the release tripping operation takes place may be varied by shifting the position of the rod 253. In each instance, the latter passes through apertured lugs 254, 255 and 256 upon the corresponding guide member 234 and is held in adjusted position by nuts 257 and 258 engaging opposite sides of the lug 256 while in threaded engagement with the rod 253. These nuts may be loosened and the rod 253 shifted to any desired adjusted position, then the nuts screwed home.

When it is desired to run the machine without feeding the paper, as is sometimes the case, it is only necessary to rotate the trip control rod 195 and throw the pin 250 out of the path of the lugs 239. To this end we have provided the rod 195 with a crank arm 261 and move the same over a segment 262 which is suitably apertured to receive the locking pin 263 to hold the arm either in or out of paper feeding position.

In order to take up slack in the chains 192, we preferably mount the shafts 212 of the upper sprocket wheels 210 upon an adjustable arm 264. The shaft 212 extends through a slot 265 in the adjacent wall of the upper casing member 63 and is secured to the arm 264 by a nut 267. As shown in Fig. 13, the lower flat face of the arm 264 fits against the rear of the member 63 adjacent to the vertical slot 265. The shaft 212 has two shoulders 267$^a$ and 267$^b$. The shoulder 267$^a$ abuts against the inside face of the flattened portion of the arm 264. Consequently when the nut 267 is screwed home the arm 264 and shaft 212 are firmly held together and move as a single unit. The shoulder 267$^b$ in turn engages the forward face of the member 63 on either side of the slot 265 and prevents the shaft 212 passing too far into the slot 265. The sprocket wheel 210 in turn is rotatably mounted on the outer end of the shaft 212 between the head on the shaft and the surface of member 63 adjacent to the slot 265, there being sufficient clearance for this purpose. The upper end of the arm 264 is threaded and passes through the lug 268 projecting from casing member 63. Nuts 269 and 270 are threaded on the end of the arm 264 so as to embrace the lug 268 and, when screwed home, to hold the arm and shaft, and consequently the sprocket wheel 210 in adjusted position. By shifting the nuts 269 and 270 upon the arm 264 the vertical position of the wheel 210 may be varied within a sufficient range to take up the slack in the corresponding feed chain. The slot 265 is in each case long enough to permit the necessary tightening movement.

As the machine is in operation the slots 235 in fingers 231 need to be cleaned out. There are accumulations of paper and product which need to be removed. In order to provide for this we employ the blades R. These are secured along their upper edges to the frame member 63 at opposite sides of the tension device P and have their lower edges free for entry into the finger slots 235 as the fingers pass upward and around into position to begin their downward stroke. In order to register with the slots 235 the blades travel in a common plane which includes said slots and this of course is the plane of feed of the paper since the cleared slots must be in position to register with the edges of the paper as they approach and pass on to it. They thus serve as guiding means as well as cleaning means. The lower edges of the blades R are not concentric with the paths of travel of the fingers 231 but are inclined inward and forward relative to the chain and its direction of travel. Hence, the entry of the knives R into the slots 251 is gradual and the accumulations of material therein are more easily and effectively removed, the blades projecting far enough into the slots as they pass through them to accomplish this result.

The proximity of the delivery ends of the blades R to the edges of the paper which will be held taut along the lines $a$, provides for accurate positioning of the finger slots 231 in registry with the paper edges just at the time the fingers pass into engagement with the paper. Indeed the outer ends of the fingers will begin to thread over the paper's edges before the inner ends of the fingers pass off the points of the cleaners R. In other words the paper begins to feed into the slots before the blade points pass out of those slots.

Besides being guided by the blades R into proper register with the edges of the paper web, the fingers 231 are guided both as they approach and as they leave the blades R. Arcuate guideways 271 and 272 serve this purpose at the receiving and delivering ends respectively of the blades. Each guideway 271 has an overhanging guiding plate 273 associated with it. The two of each pair cooperate to bring the fingers 231 into line with the receiving end of the blade with which they are associated. At the delivery end of the blade the guideways 272 extend through extended arcs and the fingers travel on them while the paper is passing into the slots of the fingers. Guideways 271 and 272 are arcuate strips attached to the face of the casing member 63. Guide plates 273 are also connected to this member. They are angular and one flange in each instance occupies a position opposite the associated guideway 271.

Both guideways 271 and 272 present inclined receiving ends, as shown at $b$ and $c$, so as to easily shift the fingers to central position, in the former case to thread the blades R into the slots of the fingers and in the latter case to thread the paper into those same slots immediately after they have been cleaned by the blades R.

While the fingers 231 pull downward upon the webs of paper, the tension device P exerts a retarding force which, combined with the pull of the chain, holds the paper taut at intermediate points. While in this condition and after each forward step of the paper feed, the lower ends of the paper strips are cut off, thus providing in succession pairs of wrappers W in position to be wrapped about the divided slices of material as they are presented for wrapping. The operation of the shear mechanism T takes place while the plunger 121 of the ejector J presses the slice parts against the wrapper sections W.

The mechanism T includes a stationary knife 275 secured to the member 63 and extending forward into substantial alignment with the plane of the feeding chains of the feed mechanism Q. Cooperating with this fixed knife 275 is a pair of knives 276 each pivoted upon a vertical pivot shaft 281 and cut away so as to straddle, in each instance, the adjacent feeding stretch of the chain. The knives 276 are oscillated to and fro by means of a frame 277 which has two upright arms 278 connected at their upper ends by links 279 to crank arms 280 upon the pivot shafts 281 of the knives 276. The frame 277 is journaled on opposite sides to portions of one of the transverse frames of the machine and at its lowermost point has a cam roller 282 which travels in the track of a cam 283 secured to secondary cam shaft 219. The shape of the cam track is such as to oscillate the frame 277 in proper timed relation with the other parts and thus actuate the shear blades 276 to properly engage the fixed blade 275 to sever the wrappers W when the paper reaches the right position. The shafts 281 are secured at their upper ends in frame members 284 and have the shear blades 276 and associated crank arm 280 journaled thereon so as to bring the blades 276 beneath the blade 275 in cutting association with the latter. The crank arm 280 and blade 276, in each instance, oscillate together upon the associated shaft 281. A coiled spring 285 surrounds each shaft and is compressed between an adjusting nut 285′, threaded on the lower end of the shaft 281, and the arm 280. These springs 285 hold the blades 276 up to their work upon the fixed blade 275.

The main cam shaft 86 is mounted at the delivery end of the machine in a hanger 286 which extends downward from the upper frame 41 of the casing B. At the power end the same shaft is supported by a hanger 287 similar to the hanger 286 but larger to accommodate a worm drive including a pinion 288 and worm wheel 289, the latter being free to rotate on the shaft 86 but adapted to be connected thereto by the clutch 290. This clutch is operated by a bifurcated clutch lever 291 pivoted to the hanger 287. The bifurcations of the lever 291 have inwardly projecting pins which engage a peripheral slot in one clutch member, secured to the shaft 86, to shift the same longitudinally into or out of engagement with the other clutch member fixed to the worm wheel 289 but free to rotate on the shaft 86, a common arrangement as will be obvious without further illustration or description. At a suitable point in the interior of the casing B, the upper end of the clutch lever 291 is toothed for engagement with a corresponding toothed rack 293 on the rod 294 which may be rotated by hand lever 295 to throw the clutch into and out of engagement.

Were mechanical feed mechanism employed for advancing the follower E step by step, then the cam 296 on shaft 86 would be employed. This is the location of the cam for this purpose in the actual embodiment of the machine which we have completed. Its presence merely indicates the location of this part of the completed machine.

The worm wheel 288 is on a counter shaft 297 carried by the hanger 287 and sprocket wheel 298 on shaft 297 is driven from an electric motor 299 by means of a sprocket chain 300 passing over sprocket wheel 298 and sprocket pinion 301 on the motor shaft. The motor is preferably secured to the frame of the machine in a manner similar to the hangers 286 and 287. A switch box 302 is provided on the machine beneath the table 71 but obviously it may be located at any convenient point either on or off the machine. The circuits of the motor are controlled at this box. At the feeding end of the machine is a pan 308 for catching drippings from the table D. This pan may be secured to the machine in any suitable way. It is preferably detachably secured so that it may be emptied at intervals while the machine is in use.

The secondary cam shaft 219 is provided with a bearing in pedestal 303 at the delivery end of the machine and at its other end with a bearing in member 304. Pedestal 303 is secured upon plate 305 which forms part of hanger 286 which is secured to flanges 44 extending inward from the casing member 41 near its base, as before noted. Member 304 is part of the transverse frame 161. Upward extensions 306 of frame 161 support the ends of the member 304. Trunnion connections 307 provide the pivotal supports for the shear actuating frame 277. The uprights 306 also serve as pedestals for the bearings 215 of the lower sprocket wheel shafts 213. The upper sprocket wheel shafts 212 are mounted, as before noted, directly upon the upper casing member 63. The three transverse frames 87, 100 and 161, besides being secured to the casing B as before noted, are secured together by longitudinal bolts or rods 309. These frames taken with strengthening ribs and flanges of the several casing members provide a substantial frame structure for the machine.

In carrying out our invention, it will be obvious many alterations and modifications may be made in the details of the various constructions shown and described without departing from the spirit and scope of the invention. We therefore do not wish to be limited to matters disclosed but aim to cover by the terms of the appended claims, all those alterations, modifications and uses which come within the scope and purview of the invention.

What we claim as new and desire to secure by a patent of the United States, is:

1. In a machine of the class described, a semi-cylindrical container positioned with its open side uppermost, bearings in the end walls of said container, said container being adapted to hold two rolls of paper on a single spindle journaled in said bearings, a pair of guides extending above the level of the uppermost portion of rolls in said container, a downwardly extending stem for each guide, a support, apertured lugs on said support, said stems fitting in said apertures, coiled springs about said stems tending to yieldingly press said guides upwardly against the web of paper being fed thereover, means beyond said guides from said container for drawing downward on the webs of paper passing over said guides, and a flexible connection between said guides to allow a limited rotary and vertical play of such guides relative to each other.

2. In a machine of the class described, a semi-cylindrical container positioned with its open side uppermost, bearings in the end walls of said container, said container being adapted to hold two rolls of paper on a single spindle journaled in said bearings, a pair of guides extending above the level of the uppermost portion of rolls in said container, said guides having substantially aligned smooth elongated guiding surfaces extending substantially parallel to the axis of said container and well above the same, the smooth guiding surface of each guide having a length slightly greater than the width of the web fed from the roll cooperating with it, a downwardly extending stem for each guide, a support, apertured lugs on said support, said stems fitting in said apertures, coiled springs about said stems tending to yieldingly press said smooth surfaces upward against the web of paper being fed thereover, means beyond said guides from said container for drawing downward on the webs of paper passing over said smooth guiding surfaces, and a flexible connection between said guides to allow a limited rotary and vertical play of said guides relative to each other.

3. In a machine of the class described, a semi-cylindrical container positioned with its open side uppermost, bearings in the end walls of said container, said container being adapted to hold two rolls of paper on a single spindle journaled in said bearings, a pair of guides extending above the level of the uppermost portion of rolls in said container, said guides having substantially aligned smooth elongated guiding surfaces extending substantially parallel to the axis of said container and well above the same, the smooth guiding surface of each guide having a length slightly greater than the width of the web fed from the roll cooperating with it, a downwardly extending stem for each guide, a support, apertured lugs on said support, said stems fitting in said apertures, coiled springs about said stems tending to yieldingly press said smooth surfaces upward against the web of paper being fed thereover, means beyond said guides from said container for drawing downward on the webs of paper passing over said smooth guiding surfaces, a guard extending between the ends of the guiding surface on each guide above said surface to provide therewith an opening through which the corresponding web of paper passes, and a flexible connection between said guides to allow a limited rotary and vertical play of said guides relative to each other.

4. In a machine of the class described, a holder adapted to hold a roll of paper for rotation on a horizontal axis, a yielding guide bar substantially parallel to said axis over which the web of paper being drawn from said roll is adapted to pass, means to grip said web after it passes said bar and to pull it away from said bar, and a tension device operative to engage said web after it leaves said bar and before it reaches said gripping and pulling means to tension said web between said device and means; said device comprising two cooperating members having flat faces between which said web is drawn by said pulling means, one of said members being pivoted at one end for rotation toward and from its cooperating member, a spring under tension serving to yieldingly maintain said members in operative relation with said web, and auxiliary means for locally varying the retarding influence upon said web, said auxiliary means being upon said pivoted member distant from its pivoted end.

5. In a machine of the class described, a support for a roll of paper adapted to be unwound, means for pulling on the web of paper to unwind it from said roll, and a device for tensioning a portion of said web by yieldingly retarding its advance, said device comprising two cooperating members having flat faces between which said web is drawn by said pulling means, a spring under tension serving to yieldingly force said members toward each other, and auxiliary means for locally varying said yielding force at different points in the width of said cooperating members.

6. In a machine of the class described, a support for two rolls of paper adapted to be unwound, means for pulling on the webs of paper to unwind them from said rolls, and a device for tensioning portions of said webs by yieldingly retarding their advance, said device comprising two cooperating members having flat faces between which said webs are drawn by said pulling means, a spring under tension serving to yieldingly force said members toward each other, and auxiliary means for locally varying said yielding force at different points in the width of each said web.

7. In a machine of the class described, a support for a roll of paper adapted to be unwound, means for pulling on the web of paper to unwind it from said roll, and a device for tensioning a portion of said web by yieldingly retarding its advance, said device comprising two cooperating flat faced members yieldingly pressed toward each other to engage opposite sides of said web, and a plurality of spring pressed plungers projected against said web from pockets in one of said flat faced members.

8. In a machine of the class described, a support for a roll of paper adapted to be unwound, means for pulling on the web of paper to unwind it from said roll, and a device for tensioning a portion of said web by yieldingly retarding its advance, said device comprising two cooperating flat faced members yieldingly pressed toward each other to engage opposite sides of said web, a plurality of spring pressed plungers projected against said web from pockets in one of said flat faced members, and means for varying the throw of said plungers independently to vary the retarding action upon different portions of said web.

9. In a machine of the class described, two flat faced tensioning members yieldingly pressed toward each other to apply tension to a web drawn between them, a plurality of spring pressed plungers positioned in recesses in the web engaging face of one of said members, and means for independently adjusting the positions of said plungers to provide different tensions of the web at different points.

10. In a machine of the class described, two flat faced tensioning members yieldingly pressed toward each other to apply tension to a web drawn between them, a plurality of plungers positioned in pockets in the web engaging face of one of said members, stems for said plungers extending through openings in said pocketed members, the outer ends of said stems being threaded, nuts threaded on the ends of said stems to limit the outward movement of said plungers from their pockets, and coiled compression springs about said stems within said pockets tending to force said plungers outward from said pockets.

11. In a machine of the class described, an upright paper guide, a paper holder on one side of said guide, a pulling device on the other side of said guide for intermittently gripping and pulling the paper on that side of said giude downward, a tensioning member over which said paper passes after it leaves said guide, a second tensioning member pivoted to swing on the one hand into a closed position to engage the paper as it passes over said first tensioning member and on the other hand into an open paper-exposing position wherein all its parts are distant from the paper far enough to leave the latter accessible for easy hand treatment and adjustment, and a spring for yieldingly holding said pivoted member in paper-engaging position, said spring, however, being sufficiently yielding to allow of the manual rotation of said pivoted member to said open paper-exposing position.

12. In a machine of the class described, an upright paper guide, a paper holder on one side of said guide and on the other side a pulling device for intermittently gripping and pulling the paper downward as it leaves said guide, a tensioning member over which said paper travels in its downward movement, a second tensioning member, a transverse rod by which said second tensioning member is pivotally supported at its lower edge, supports for said rod, and a tension spring coiled about said rod and secured at one end to said second tensioning member and at the other end to a fixed part of the machine, said spring when unrestrained yieldingly pressing said second tensioning member toward said first tensioning member to cause said members to press against the paper to hold it taut when being pulled upon by said pulling device and yet permitting said second tensioning member to be moved to a distance from said paper to leave the latter readily accessible for hand treatment and adjustment.

13. In a machine of the class described, an upright paper guide, a paper holder on one side of said guide, a pulling chain on the other side of said guide having one stretch movable in a downward path adjacent to that of one edge of the web of paper, slotted fingers on said chain adapted to receive the web edge-on in their slots, means carried by said fingers for clamping the web securely in said slots, an upper trip for actuating said clamping means to grip said web, a lower trip for actuating said clamping means to free said web, means below said guide and above said upper trip to yieldingly retard the downward travel of said web when drawn downward by said fingers, to render the web taut at the point where it must be fed edge-on into the slot of an oncoming finger just before said clamping means are moved into clamping position.

14. In a machine of the class described, an upright paper guide, a paper holder on one side of said guide adapted to hold two rolls of paper on a common axis, a pair of endless chains movable in a common plane on the other side of said guide from said holder, upper and lower supporting sprocket wheels for said chains, the adjacent inner stretches of said chains being movable downward in paths adjacent to the edges of the webs of paper passing downward from said guide, slotted fingers on said chains adapted to receive edge-on in their slots the opposite edges of said webs, means carried by said fingers for clamping said webs to said fingers, trip means near the top of the path of downward travel of said fingers to cause said clamping means to grip said webs, trip means near the bottom of said path of downward travel to cause said clamping means to free said webs, means below said guide and above said upper trip means to yieldingly retard the downward travel of said webs when drawn downward by said fingers, to render said webs taut at the point where they are threaded edge-on into the slots of their respective fingers just before said clamping means are moved into paper clamping position.

15. In a machine of the class described, a pulling chain, slotted fingers on said chain adapted to receive a web of paper edgewise in their slots, means carried by each said finger for clamping said web securely in the slot of that particular finger, a tensioning member over which said paper travels when drawn by said chain, a second tensioning member, a spring secured to said second tensioning member and operative to yieldingly press said second member against the paper web passing over said first member to render the paper taut where its edge enters the slots of said fingers, closing and opening trips to operate said clamping means on said fingers at separated points to grip and release said paper, the former operating at a point between the latter and said tensioning members, and means for throwing said closing trip out of service.

16. In a machine of the class described, a pulling chain, slotted fingers on said chain adapted to receive a web of paper edgewise in their slots, means carried by each of said fingers for clamping the web securely in the slot of that particular finger, a tensioning member over which said paper travels when drawn by said chain, a second tensioning member, a rotary transverse rod by which said second tensioning member is pivotally supported at its lower edge, a tension spring coiled about said rod and secured at one end to said second tensioning member and at its other end to a fixed part of the machine, said spring operating to normally hold said second tensioning member yieldingly against the paper as it passes over said first tensioning member to retard the advance of the paper and render it taut where its edge enters the slots of said fingers, a closing trip for actuating said clamping means to grip said web, an opening trip for actuating said clamping means to release said web when gripped, and means on said transverse rod to shift said closing trip to inoperative position in response to a partial rotation of said rod.

17. In a machine of the class described, a pulling chain, slotted fingers projecting from said chain, sprocket wheels over which said chain travels, the slots in said fingers being at all times in a common plane, and a cleaning blade for said slots lying in said plane and projecting into the path of travel of said fingers so as to enter and clean said slots as said chain travels.

18. In a machine of the class described, a pulling chain, slotted fingers projecting from said chain, sprocket wheels over which said chain travels, the slots in said fingers being at all times in a common plane, and a cleaning blade for said slots lying in said plane and projecting into the path of travel of said fingers so as to enter and clean said slots as said chain travels, said blade having its edge adjacent to said chain inclined inward and forward relative to said chain and its direction of travel and projecting far enough to enter and pass through said slots to remove accumulations of material therein, the entry of the blade in each instance being gradual as the chain advances due to the said inclination of said blade.

19. In a machine of the class described, a pulling chain, means for guiding a web of paper so as to bring one edge of the web adjacent to one stretch of said chain, slotted fingers on said chain adapted to receive said web edgewise into said slots, means for clamping said web securely in said slots during the travel of the fingers along said stretch, and a cleaning blade in the plane of said slots for entering and removing accumulations of material therefrom just as said fingers approach the edge of the paper that is to pass into said slots.

20. In a machine of the class described, a pulling chain, means for guiding a web of paper so as to bring one edge of the web adjacent to one stretch of said chain, slotted fingers on said chain adapted to receive said web edgewise into said slots, means for clamping said web securely in said slots during the travel of the fingers along said stretch, and a cleaning blade in the plane of said slots for entering and removing accumulations of material therefrom just as said fingers approach the edge of the paper that is to pass into said slots, said blade having its edge adjacent to said chain inclined inward and forward relative to said chain and its direction of travel and projecting far enough to enter and pass through said slots to remove accumulations of material therein, the entry of the blade in each instance being gradual as the chain advances due to the said inclination of said blade.

21. In a machine of the class described, a pulling chain, means for guiding a web of paper with its edge extending along one stretch of said chain and tensioning the same as it is being advanced by said chain, slotted fingers on said chain having slots lying in the plane of the adjacent web of paper adapted to receive the web edgewise into said slots as the chain enters upon its travel through said stretch, means carried by each of said fingers for securely clamping the web in its slot, closing and opening trips for actuating said clamping means on said fingers, the former operating near the beginning of said stretch and the latter near the end of the same, and a cleaning blade in the plane of the tensioned portion of said web and projecting into the path of travel of said fingers at a point other than said stretch, whereby said blade may enter the slots of said fingers at a point where said clamping means are open and remove accumulations of material from said slots.

22. In a machine of the class described, a pulling chain, means for guiding a web of paper with its edge extending along one stretch of said chain and tensioning the same as it is being advanced by said chain, slotted fingers on said chain having slots lying in the plane of the adjacent web of paper adapted to receive the web edgewise into said slots as the chain enters upon its travel through said stretch, means carried by each of said fingers for securely clamping the web in its slot, closing and opening trips for actuating said clamping means on said fingers, the former operating near the beginning of said stretch and the latter near the end of the same, and a cleaning blade in the plane of the tensioned portion of said web and projecting into the path of travel of said fingers at a point other than said stretch, whereby said blade may enter the slots of said fingers at a point where said clamping means are open and remove accumulations of material from said slots, said blade having its edge adjacent to said chain inclined inward and forward relative to said chain and its direction of travel and projecting far enough to enter and pass through said slots to remove accumulations of material therein, the entry of the blade in each instance being gradual as the chain advances due to the said inclination of said blade.

23. In a machine of the class described, a paper web pulling chain having projecting web-engaging fingers, each finger comprising an elongated body secured at one end to the chain and having the greater portion of its length provided with a slot for the entry of the paper, the body portion on one side of said slot having a longitudinal bore opening on one side into said slot, a rotary cam rod in said bore having a plurality of cam surfaces for engaging the paper and pressing it against the body portion on the other side of said slot, the latter portion being slitted to provide a plurality of yielding tongues, each cooperating with one of said cam surfaces, and actuating arms secured to said cam rod by which the latter may be thrown into and out of paper-clamping position.

24. In a machine of the class described, an upright paper guide, a paper holder on one side of said guide, a pair of pulling chains having all portions in a common plane on the other side of said guide, adjacent stretches of said chains being movable in parallel downward paths in position to engage the outer edges of paper positioned between said stretches, slotted fingers for receiving the paper in their slots, means for securing the paper to the fingers during their downward travel and releasing the same when a proper amount has been advanced, means between said guide and said advancing chain stretches for yieldingly retarding the downward travel of the paper to render the same taut, driving sprocket wheels mounted upon axes coincident with the lowermost of said chain sprocket wheels, parallel main and secondary shafts, sprocket wheels on said parallel shafts respectively located with said driving sprocket wheels in a common plane, a driving sprocket chain passing over all of said sprocket wheels in said common plane to drive said feed chains and said secondary shafts from said main shaft, and means for driving said main shaft.

25. In a machine of the class described, an upright paper guide, a paper holder on one side of said guide, a pulling chain on the other side of said guide having one stretch movable in a downward path adjacent to that of one edge of the web of paper, slotted fingers on said chain adapted to receive the web edge-on in their slots, a cleaning and guiding blade in the plane of travel of said web adapted to enter the slots of said fingers as they approach the paper web to clean said slots and to guide said fingers into slot-receiving engagement with said paper web, means carried by said fingers for clamping the web securely in said slots, an upper trip for actuating said clamping means to grip said web, a lower trip for actuating said clamping means to free said web, means below said guide and above said upper trip to yieldingly retard the downward travel of said web when drawn downward by said fingers, to render the web taut at the point where it must be fed edge-on into the slot of an oncoming finger just before said clamping means are moved into clamping position.

26. In a machine of the class described, an upright paper guide, a paper holder on one side of said guide adapted to hold two rolls of paper on a common axis, a pair of endless chains movable in a common plane on the other side of said guide from said holder, upper and lower supporting sprocket wheels for said chains, the adjacent inner stretches of said chains being movable downward in paths adjacent to the edges of the webs of paper passing downward from said guide, slotted fingers on said chains adapted to receive in their slots the opposite edges of said webs, cleaning and guiding blades in the plane of travel of said webs adapted to enter the slots of said fingers as they approach the paper web to clean said slots and to guide said fingers into slot-receiving engagement with said paper web, means carried by said fingers for clamping said webs to said fingers, trip means near the top of the path of downward travel of said fingers to cause said clamping means to grip said webs, trip means near the bottom of said path of downward travel to cause said clamping means to free said webs, means below said guide and above said upper trip means to yieldingly retard the downward travel of said webs when drawn downward by said fingers, to render said webs taut at the point where they are threaded into the slots of their respective fingers just before said clamping means are moved into paper clamping position.

27. In a machine of the class described, a pulling chain, slotted fingers projecting from said chain, sprocket wheels over which said chain travels, the slots in said fingers being at all times in a common plane, a cleaning and guiding blade lying in said plane and projecting into the path of travel of said fingers so as to enter said slots as said chain travels, and means cooperating with said fingers to present a taut web of paper in said common plane adjacent to one stretch of said chain whereby said blade upon entering said finger slots will not only clean said slots but also guide said fingers so as to present them to said web with said slots in register with said web.

28. In a machine of the class described, a pulling chain, means for guiding a web of paper so as to bring one edge of the web adjacent to one stretch of said chain, slotted fingers on said chain adapted to receive said web edgewise into said slots, means for clamping said web securely in said slots during the travel of the fingers along said stretch, and a cleaning and guiding blade in the plane of said slots positioned so as to enter them successively not only to clean them but also to remain therein long enough to insure that each of said fingers is threaded on to the edge of the paper, whereby the slots are brought into register with the edge of the paper prior to the actuation of said clamping means.

29. In a machine of the class described, a pulling chain, means for guiding a web of paper with its edge extending along one stretch of said chain and tensioning the same as it is being advanced by said chain, slotted fingers on said chain having slots lying in the plane of the adjacent web of paper adapted to receive the web edgewise into said slots as the chain enters upon its travel through said stretch, means carried by each of said fingers for securely clamping the web in its slot, closing and opening trips for actuating said clamping means on said fingers, the former operating near the beginning of said stretch and the latter near the end of the same, and a cleaning and guiding blade in the plane of the tensioned portion of said web and projecting into the path of travel of said finger slots to enter the same to clean the slots and guide said fingers on to the adjacent web of paper.

30. In a machine of the class described, a pulling chain, means for guiding a web of paper so as to bring one edge of the web adjacent to one stretch of said chain, slotted fingers on said chain adapted to receive said web edgewise into said slots, means for clamping said web securely in said slots during the travel of said fingers along said stretch, sprocket wheels over which said chain travels, and a cleaning and guiding blade near one of said wheels in the plane of said slots adapted to enter said slots successively to clean the same and to remain therein while said chain travels in a curved path around said adjacent sprocket wheel, the blade, fingers and web path being so related that the outer end of the slot of each finger receives the edge of said web of paper before the inner end of the same slot passes off of said blade, and said blade having its edge toward said sprocket wheel inclined so as to lie nearer said wheel as it approaches the path of travel of said web of paper.

31. In a machine of the class described, a pulling chain, slotted fingers projecting from said chain, sprocket wheels over which said chain travels, the slots in said fingers being at all times in a common plane, means for presenting the taut edge of a web of paper to said fingers, and a blade in said common plane projecting into the path of travel of said slots as the fingers pass over one of said sprocket wheels and are about to pass into threaded engagement with said slots, said blade extending near to the edge of the paper web and being adapted to occupy the inner end of each slot as its outer end receives the web of paper presented to it, and said blade having its edge toward said sprocket wheel inclined so as to lie nearer said wheel as it approaches the path of travel of said web of paper.

32. In a machine of the class described, a pulling chain, slotted fingers projecting from said chain, sprocket wheels over which said chain travels, the slots during part of the stroke presenting themselves in a given plane, a blade in said plane for threading said slots, and guideways at the receiving end of said blade for presenting oncoming fingers to said blade with their slots in register therewith.

33. In a machine of the class described, a pulling chain, slotted fingers projecting from said chain, sprocket wheels over which said chain travels, the slots during part of the stroke presenting themselves in a given plane, a blade in said plane for threading said slots, guideways at the receiving end of said blade for presenting oncoming fingers to said blade with their slots in register therewith, means for presenting a web of paper edgewise to the blade at the delivery end of said blade, and guideways at said delivery end cooperating with said blade to deliver the fingers threaded thereon into like engagement with said paper web.

34. In a machine of the class described, a pulling chain, slotted fingers projecting from said chain, sprocket wheels over which said chain travels, the slots during part of the stroke presenting themselves in a given plane, a blade in said plane for threading said slots, guideways at the receiving end of said blade for presenting oncoming fingers to said blade with their slots in register therewith, means for presenting a web of paper edgewise to the blade at the delivery end of said blade, and guideways at said delivery end cooperating with said blade to deliver the fingers threaded thereon into like engagement with said paper web.

HARLEY R. PHILLIPS.
HENRY J. CLARKE.